(12) United States Patent
Kozu et al.

(10) Patent No.: US 6,822,420 B2
(45) Date of Patent: Nov. 23, 2004

(54) BATTERY POWER SOURCE DEVICE INCLUDING RECHARGEABLE BATTERY AND CIRCUIT BOARD JOINED THERETO

(75) Inventors: Katsumi Kozu, Sanda (JP); Shigeo Aoki, Ikoma (JP); Takashi Takemura, Shijonawate (JP); Junji Fujiwara, Izumiotsu (JP); Yoshinori Koyanagi, Hirakata (JP); Keisuke Tanaka, Suita (JP); Motohide Masui, Wakayama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 64 days.

(21) Appl. No.: 10/220,916

(22) PCT Filed: Mar. 14, 2001

(86) PCT No.: PCT/JP01/02030

§ 371 (c)(1),
(2), (4) Date: Oct. 22, 2002

(87) PCT Pub. No.: WO01/69699

PCT Pub. Date: Sep. 20, 2001

(65) Prior Publication Data

US 2003/0146734 A1 Aug. 7, 2003

(30) Foreign Application Priority Data

| Mar. 14, 2000 | (JP) | 2000-070632 |
|---|---|---|
| Mar. 14, 2000 | (JP) | 2000-070633 |
| May 22, 2000 | (JP) | 2000-149424 |
| Sep. 25, 2000 | (JP) | 2000-290817 |
| Nov. 2, 2000 | (JP) | 2000-335641 |
| Mar. 9, 2001 | (JP) | 2001-067026 |

(51) Int. Cl.$^7$ .............................. H01M 10/46
(52) U.S. Cl. ........................................ 320/107
(58) Field of Search ................. 320/107, 110, 320/112, 116

(56) References Cited

U.S. PATENT DOCUMENTS 5,403,785 A 4/1995 Arai et al.

FOREIGN PATENT DOCUMENTS

| EP | 1033766 | 9/2000 |
|---|---|---|
| JP | 63-66848 | 3/1988 |
| JP | 1-64220 | 4/1989 |
| JP | 4-181648 | 6/1992 |
| JP | 4-188563 | 7/1992 |
| JP | 6-216505 | 8/1994 |
| JP | 9-260803 | 10/1997 |
| JP | 9-283103 | 10/1997 |
| JP | 9-298053 | 11/1997 |
| JP | 10-241647 | 9/1998 |
| JP | 2000-340194 | 12/2000 |
| JP | 2001-135674 | 5/2001 |

*Primary Examiner*—Edward H. Tso
(74) *Attorney, Agent, or Firm*—Jordan and Hamburg LLP

(57) ABSTRACT

A battery power source device including a plurality of rechargeable batteries (1) having a laminated sheet as an outer case, and having extended positive and negative electrode leads of a metal foil is provided. A circuit board (3) and a plurality of rechargeable batteries are positioned in a pack case (2), a soldering land (21) is formed in the extending direction of the positive and negative electrode leads (11) and (12) of the rechargeable batteries, and a circuit pattern formed on the circuit board allows the circuit board and the rechargeable batteries to be connected without applying force in the bending or distortional direction to the positive and negative electrode leads of a foil.

29 Claims, 31 Drawing Sheets

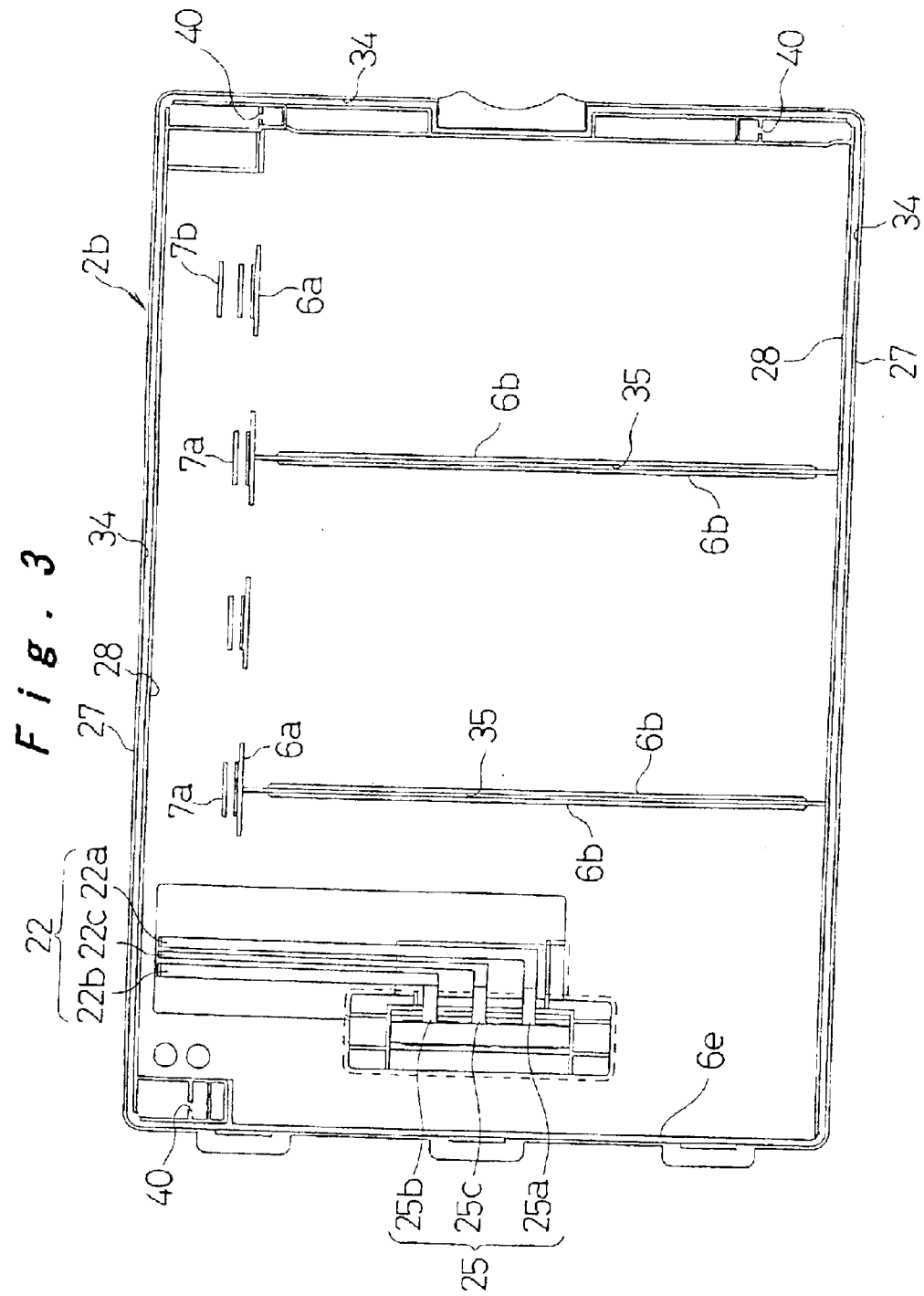

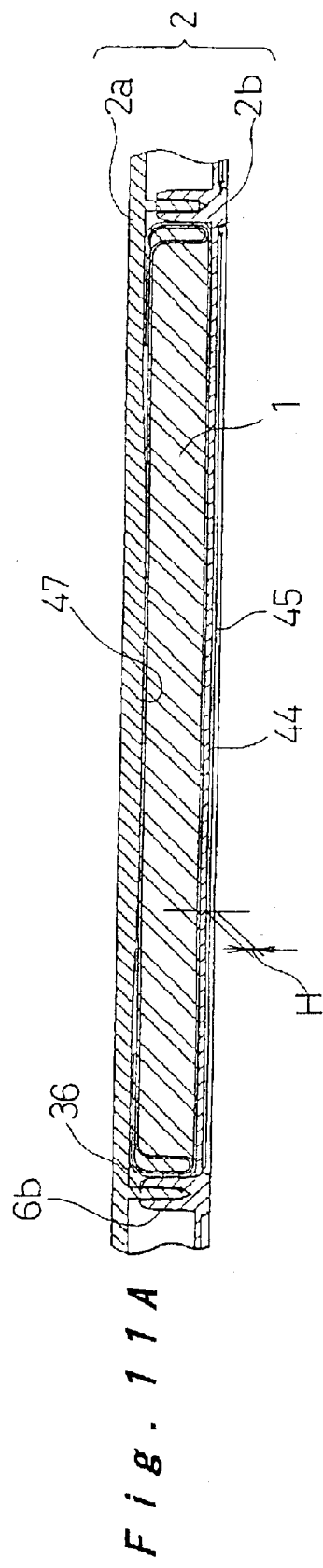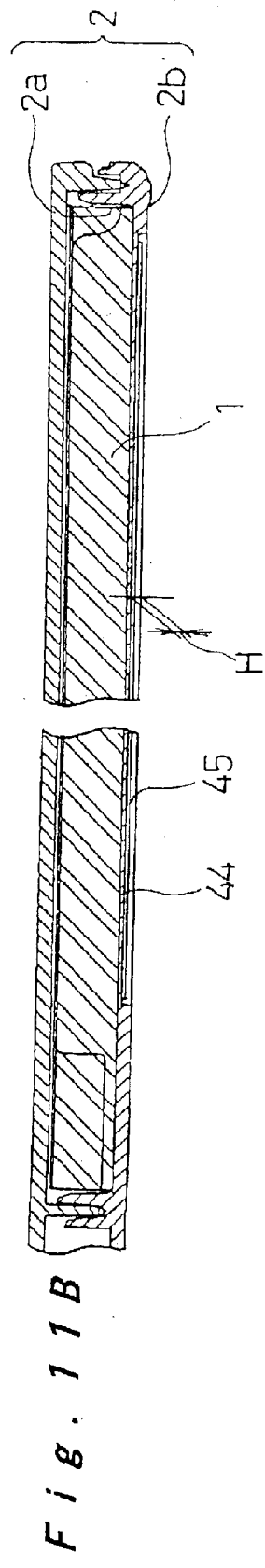

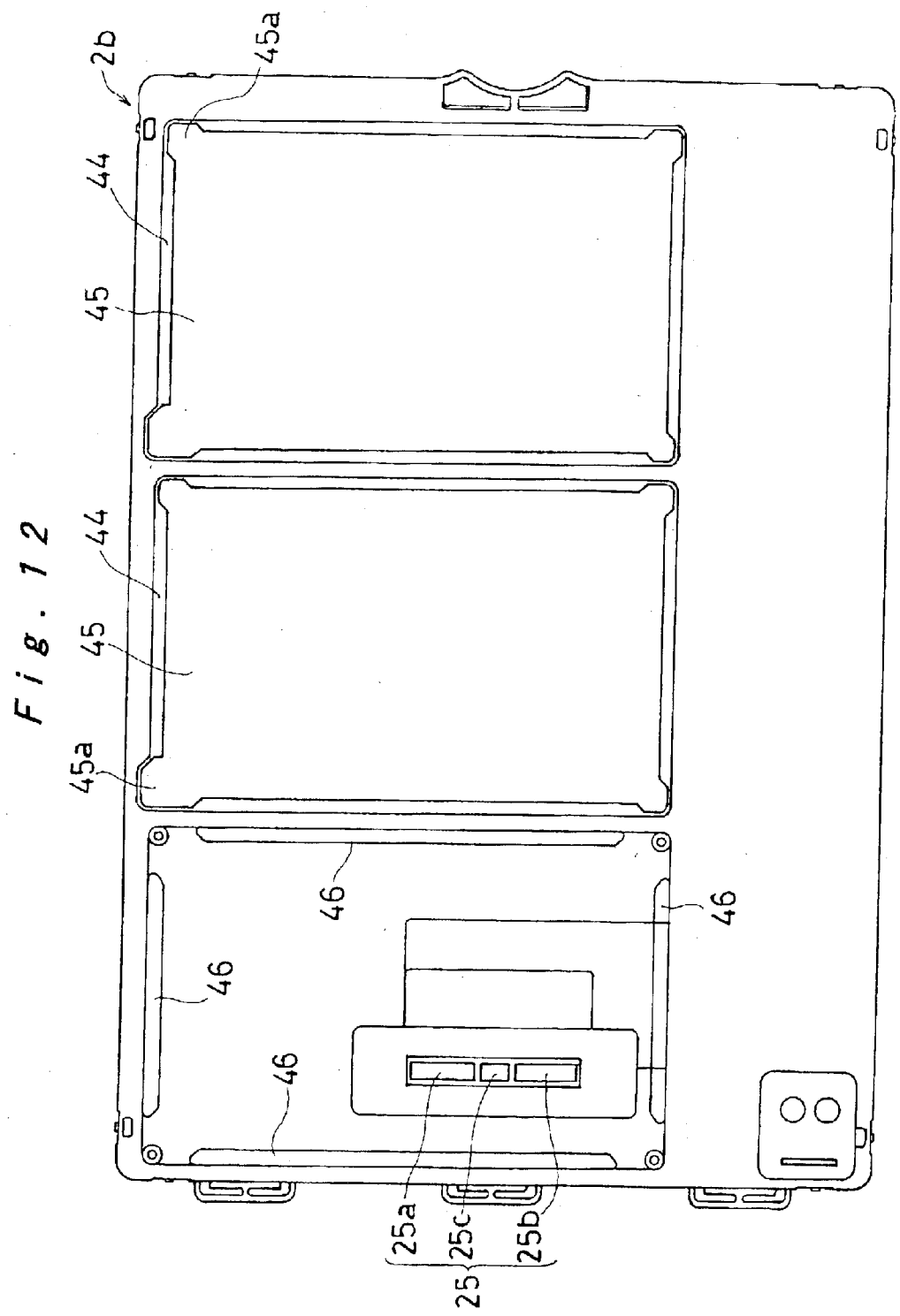

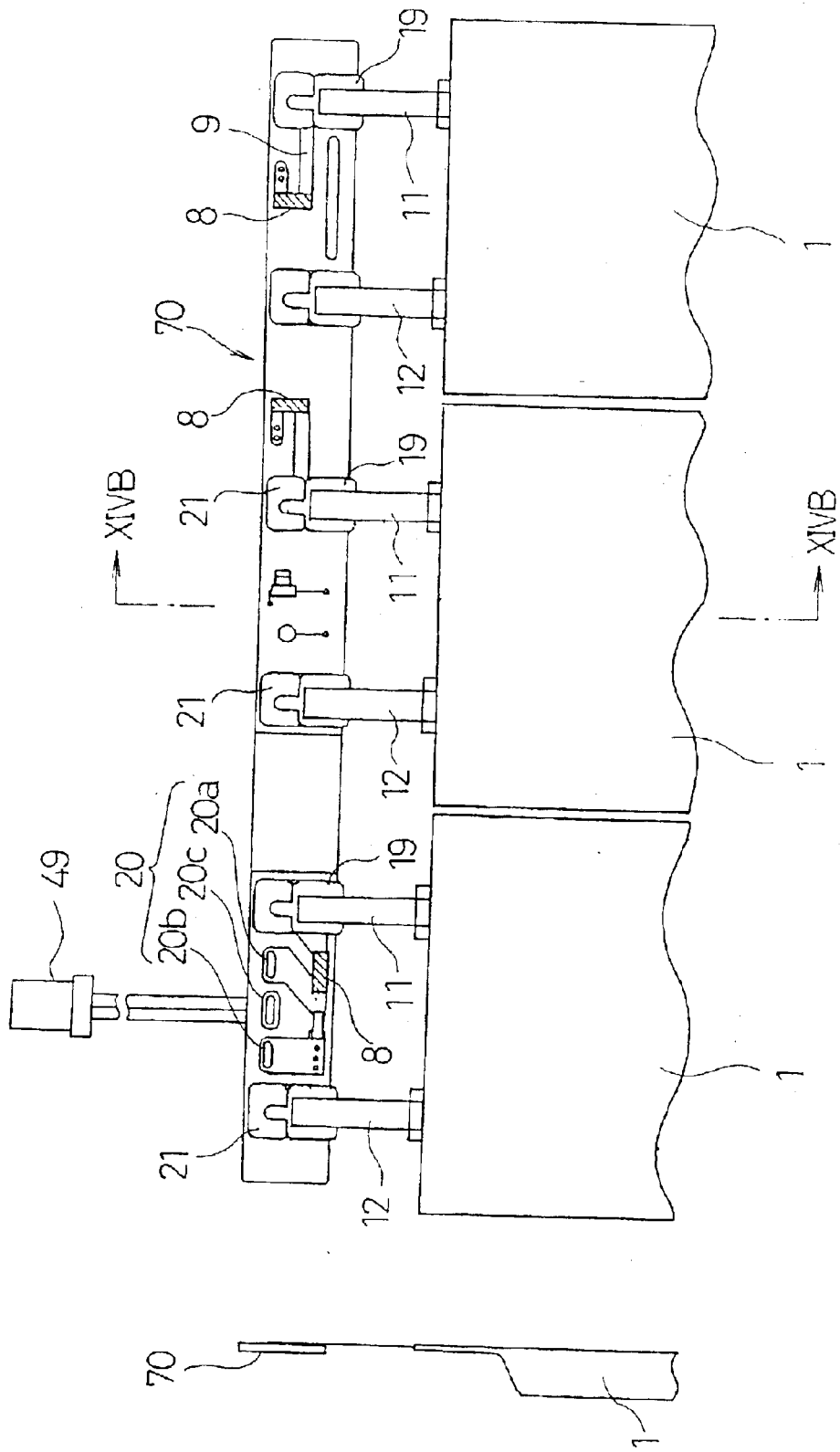

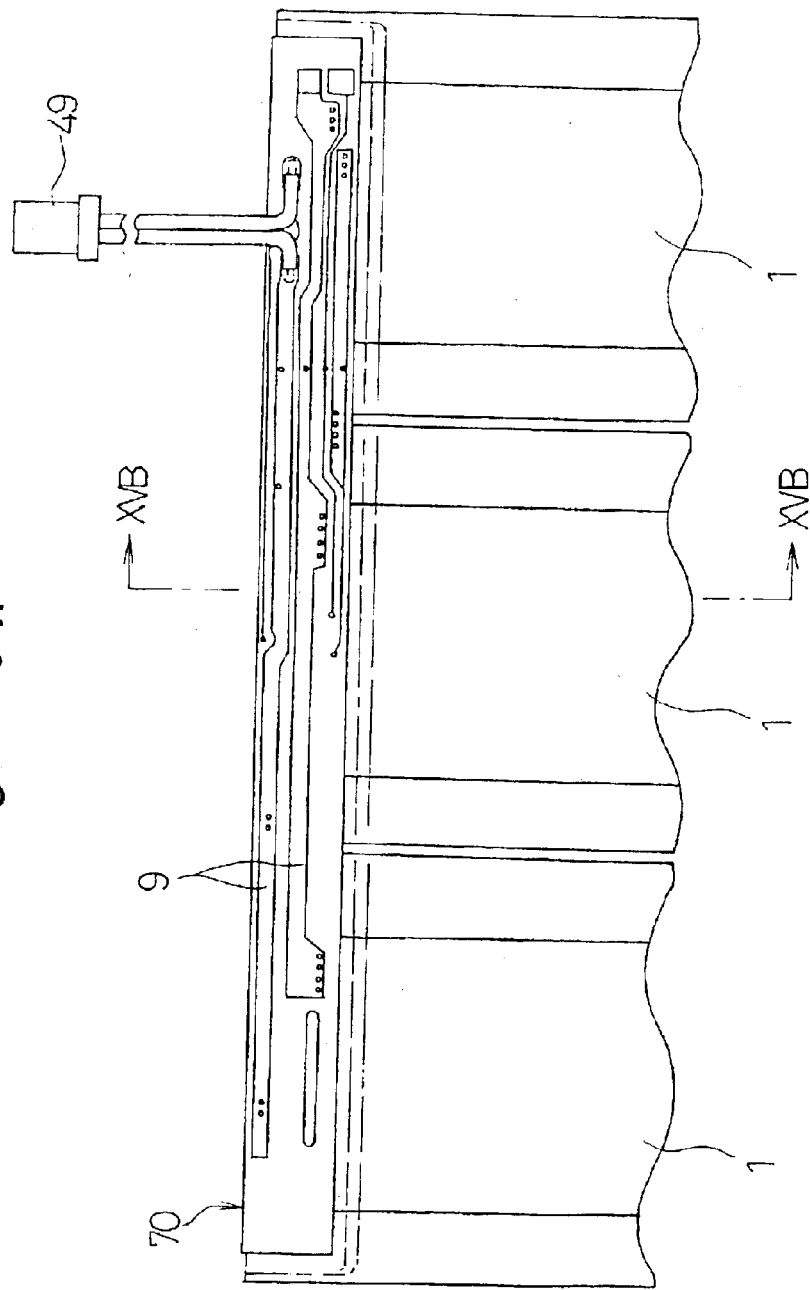
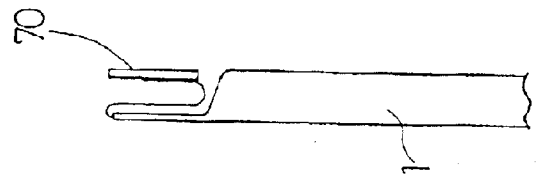

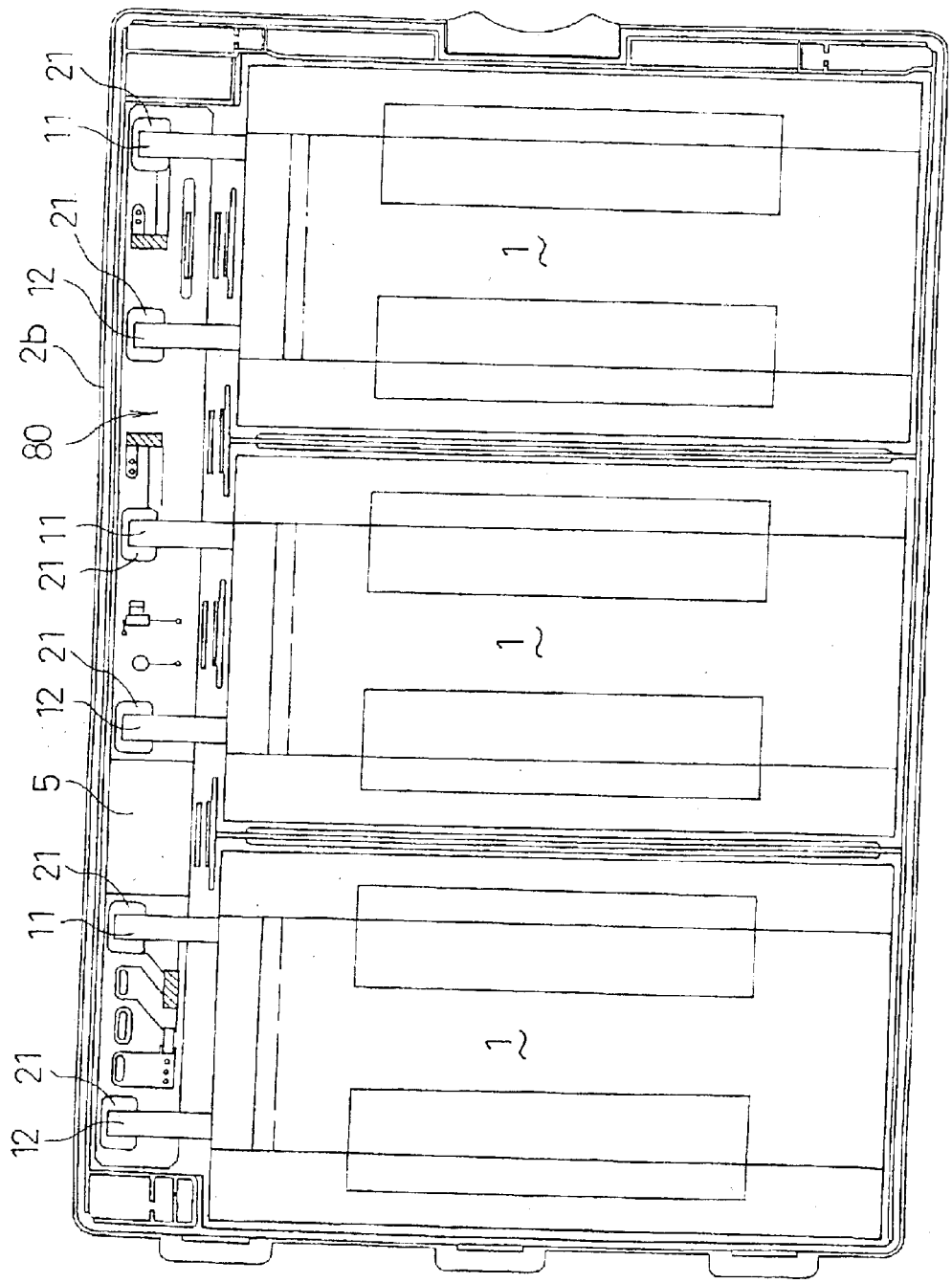

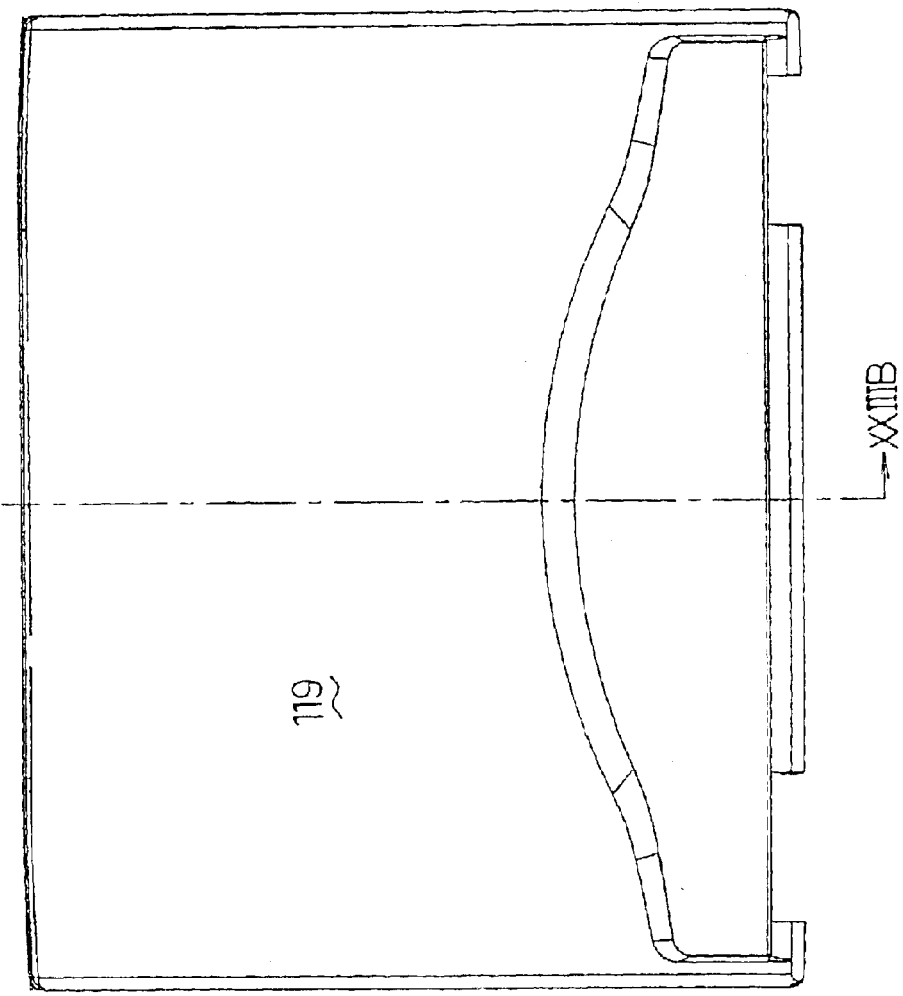
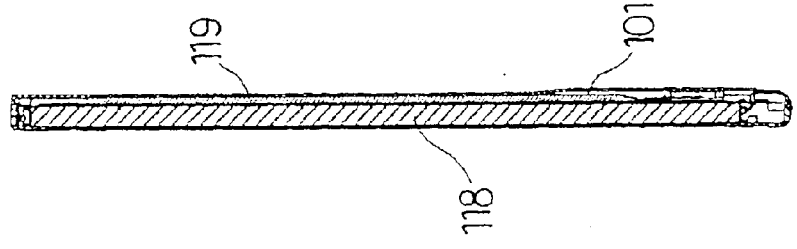

Fig. 24
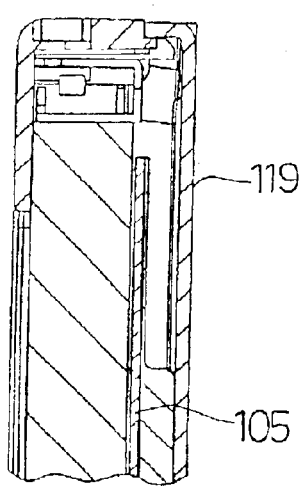
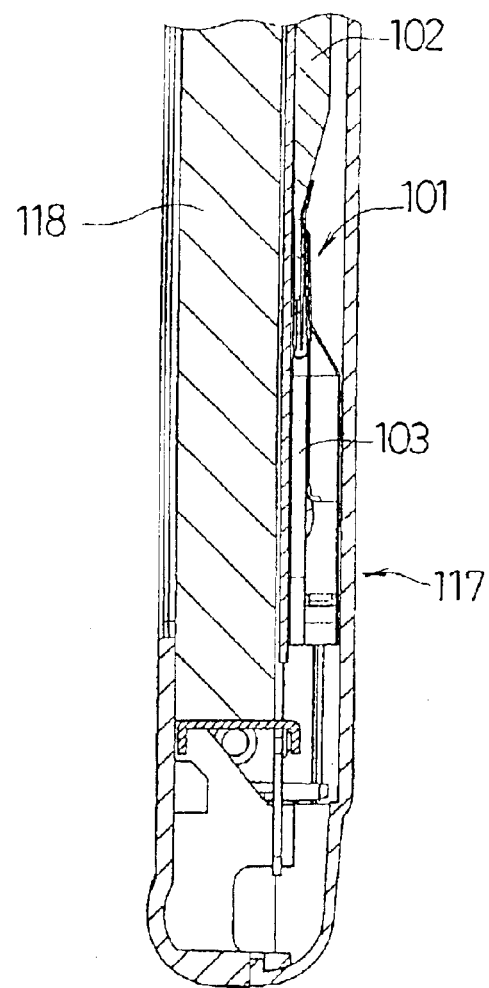

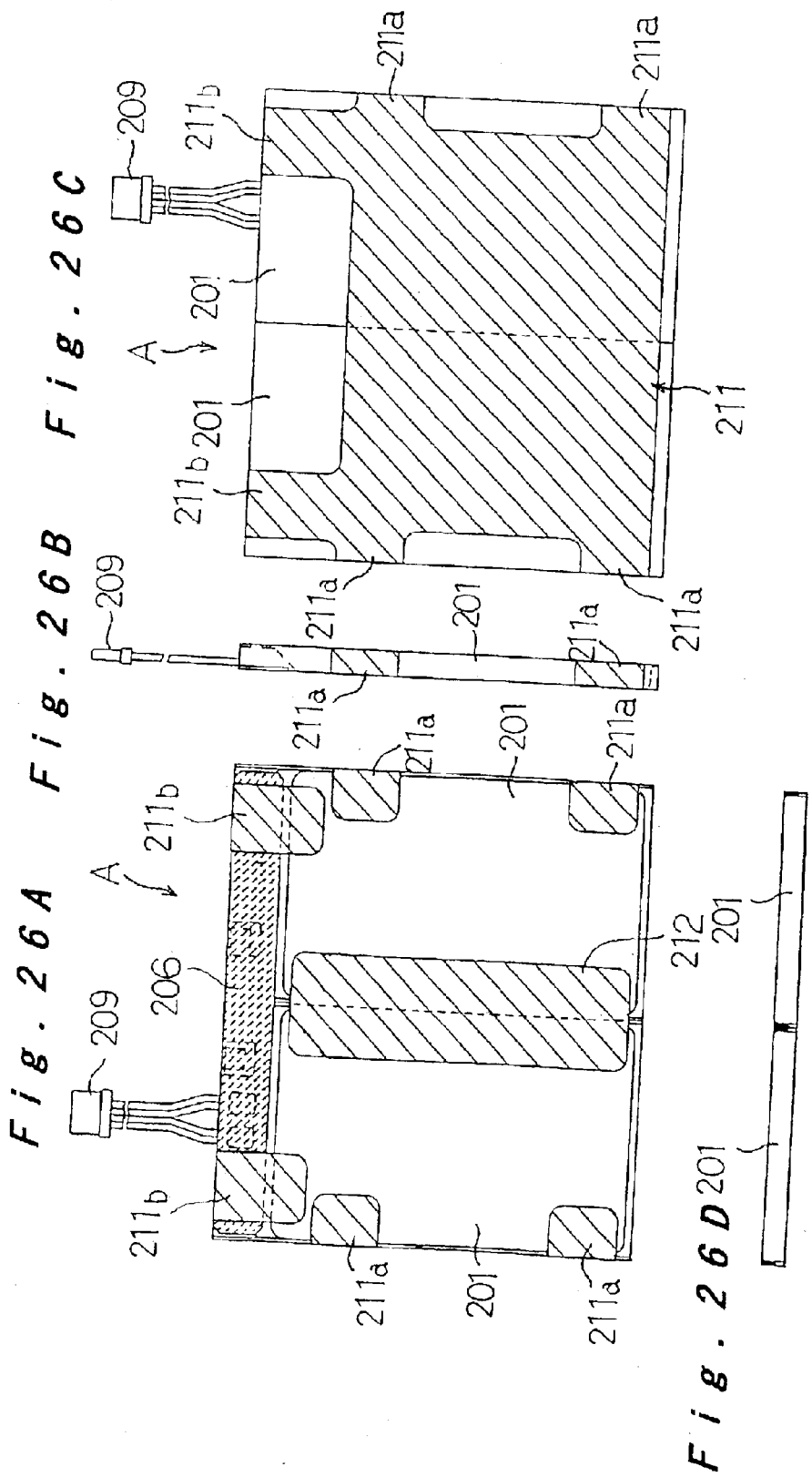

BATTERY POWER SOURCE DEVICE INCLUDING RECHARGEABLE BATTERY AND CIRCUIT BOARD JOINED THERETO

TECHNICAL FIELD

The present invention relates to a rechargeable battery storing a power generating element in an outer case made of a laminated sheet, and having positive and negative electrodes extended as a metallic foil lead. The invention also relates to a battery power source device such as a battery pack including such a rechargeable battery and a circuit board having a battery protection circuit or the like.

BACKGROUND ART

More lightweight, compact and thinner mobile information equipment and audio equipment such as a mobile phone and a mobile computer are in demand so that they can more comfortably be carried around. It should be no exaggeration to say that battery power source devices such as a battery pack hold the key to these improvements. There are demands in particular for more lightweight and thinner power source devices using rechargeable batteries.

Consequently, rechargeable batteries must be reduced in weight and thickness, and there are commercially available rechargeable batteries having a power generating element enclosed in a packaging material of a laminated sheet made by coating both sides of a metal layer with a resin layer. Such a rechargeable battery is surely more lightweight and thinner than the conventional rechargeable battery with a metallic case, while it has less mechanical strength or less heat resistance. Since the positive and negative electrodes are extended as a metallic foil lead, the rechargeable batteries must be handled with considerable care particularly when they are connected in parallel to obtain large battery capacity or when they are connected in series to obtain high voltage. A battery power source device using rechargeable batteries, especially lithium-based rechargeable batteries must have a battery protection device to protect the rechargeable batteries from being overcharged/overdischarged, and therefore how to connect the rechargeable batteries and the battery protection device must be considered as well.

FIG. 35 is a view of a conventional battery pack including a parallel-connection of three lithium polymer rechargeable batteries 401 having an outer case of a laminated sheet, and the batteries are connected to a circuit board 415 having a battery protection circuit. The battery pack is stored in a pack case to complete the battery pack.

As described above, the positive and negative electrodes of the rechargeable battery 401 are both formed as a metallic foil lead having a thickness of at most 0.1 mm. For example, the positive electrode lead 411 is of aluminum and the negative electrode lead 412 is of copper. It is difficult to wire the leads or connect them with a wiring lead. Consequently, in the conventional arrangement, a positive electrode metal plate 416 and a negative electrode metal plate 417 are provided on the sides of an insulating material 418, and the positive electrode leads 411 of the rechargeable batteries 401 are connected to the positive electrode metal plate 416, while the negative electrode leads 412 are connected to the negative electrode metal plate 417. The positive and negative electrode metal-plates 416 and 417 are connected to the circuit board 415 having the battery protection circuit, so that the rechargeable batteries 401 are connected in parallel and power is input/output through the battery protection circuit.

In this arrangement, however, the positive and negative electrode leads 411 and 412 extended from the rechargeable batteries 401 cannot be connected on the same plane, therefore the workability is low and the positive and negative electrode leads 411 and 412 could be damaged during the working. The connection of the positive electrode leads 411 to the positive electrode metal plate 416 and the connection of the negative electrode leads 412 to the negative electrode metal plate 417 are in the front-back relation, the positive electrode leads 411 and the negative electrode leads 412 could be in contact with the negative electrode metal plate 417 and the positive electrode metal plate 416, respectively. Thus, the insulation between the positive electrodes and the negative electrodes must be enhanced. Moreover, when the metal plates 416 and 417 for the positive and negative electrodes are contacted with the rechargeable batteries 401 because of impact or vibration, the outer case made of a laminated sheet could be damaged. Thus, the rechargeable batteries 401 and the positive and negative electrode metal plates 416 and 417 must be secured. For the purpose, an insulating member or a securing member must be provided at the pack case, which increases the number of necessary members and the number of steps.

What is worse, when a battery power source device includes rechargeable batteries having an outer case made of a soft laminated sheet and is subjected to impact or vibration, the rechargeable batteries could be moved by the weight of the power generating element, which could break off or bend the foil lead extended to the outside from the outer case or the outer case could be damaged. It is therefore a common practice to secure the rechargeable battery to the inner surface of the pack case with a double-faced adhesive tape. Meanwhile, in the rechargeable battery using the soft laminated sheet for the outer case, the strength of securing the power generating element by the outer case is lower than a rechargeable battery storing a power generating element in a metallic case. Thus, if the outer case does not move, the power generating element stored inside could move, which could cause the leads extended from the positive and negative electrode plates to break off or bend in the outer case. The double-faced adhesive tape used to secure the rechargeable battery at the mounting position often damages or scars the outer case when a lining sheet is removed from the tape, and the appearance or reliability of the rechargeable battery could be degraded. In addition, the work of removing the lining sheet lowers the workability.

When the electrode plate is expanded because of repeated charge/discharge or changes with time, the rechargeable battery becomes thicker because the outer case is made of a soft material. As a result, the pack case storing the rechargeable battery could deform or the device provided with the battery pack could adversely be affected.

When the positive and negative electrode leads of a rechargeable battery are connected with a circuit board, the aluminum of the positive electrode lead in particular cannot be soldered to a soldering land on the circuit board. Thus, a plate member of nickel for example is joined to the tip ends of the positive and negative electrode leads by ultrasonic joining, and the plate member is joined to the soldering land on the circuit board by soldering. This method however requires a step of joining the plate member to the positive and negative electrode leads of the rechargeable battery, which increases the number of steps. When a rechargeable battery is handled as a plate member is joined to the tip ends of the positive and negative electrode leads that are made of a low strength foil, an increased weight upon the tip ends tends to cause damages such as breaks and bends to the positive and negative electrode leads.

The soft outer body tends to be scarred or deformed. When a battery power source device is constituted with a plurality of rechargeable batteries, the rechargeable batteries and a circuit board having a battery protection circuit and the like must be integrated, and the elements therefor must be stored in a pack case, which impedes further reduction in the thickness and weight of the battery power source device. In addition, the positive and negative electrode leads are made of a metal foil, and therefore the leads could be disconnected by vibration in ultrasonic welding to join them to the circuit board.

When the rechargeable batteries are combined with a circuit board and formed into a battery pack, the added thickness of the circuit board reduces the advantage that the rechargeable batteries are thin. Thus combining the circuit board also increases the plane space, and the size of a device to install such a battery pack could not be reduced as desired accordingly.

An object of the present invention is to provide a rechargeable battery directed to a solution to the above-described disadvantages when a battery power source device is composed of a rechargeable battery having an outer case made of a laminated sheet, a method of joining leads therefor, and a battery power source device using such rechargeable batteries.

DISCLOSURE OF THE INVENTION

According to a first aspect of the present invention, a battery power source device includes a plurality of rechargeable batteries storing a power generating element in an outer case made of a laminated sheet and formed in a flat, approximately prismatic shape. Positive and negative electrode leads of the rechargeable batteries are extended in the same direction from the same lead extended edge of the outer case thermally sealed. The plurality of rechargeable batteries are arranged in parallel so that their lead extended edges are in the same direction, and the device includes a circuit board including a conductive pattern and a battery protection device formed thereon. The circuit board is provided on the lead extended edge of each rechargeable battery, the positive and negative electrode leads of each rechargeable battery are joined to a prescribed conductive pattern formed in the extending direction of each lead on the same surface of the circuit board, so that a connection circuit formed by the conductive pattern on the circuit board connects each rechargeable battery to an input/output terminal through the battery protection device.

By the structure according to the first aspect of the invention, the positive and negative electrode leads of the plurality of rechargeable batteries are connected to the conductive pattern formed in the lead extending direction, on the same plane on the circuit board, so that the foil type leads having little strength are free from bending or torsion.

According to a second aspect of the invention, a battery power source device includes a plurality of rechargeable batteries stored in a pack case. The rechargeable battery stores a power generating element in an outer case made of a laminated sheet and is formed in a flat, approximately prismatic shape. The positive and negative electrode leads of the batteries are extended in the same direction from the same lead extended edge of the outer case. The plurality of rechargeable batteries are positioned and provided in parallel in the pack case so that their lead extending directions are in the same direction. A circuit board including a conductive pattern and a battery protection device thereon is positioned and provided on the lead extended edge of the rechargeable batteries, and the positive and negative electrode leads of each rechargeable battery are joined to a prescribed conductive pattern formed in the extending direction of each lead on the same surface of the circuit board, so that a connection circuit formed by the conductive pattern on the circuit board connects each the rechargeable battery to an input/output terminal through the battery protection device.

According to the second aspect of the invention, the positive and negative electrode leads of the plurality of rechargeable batteries are connected to the conductive pattern formed in the lead extending direction on the same plane on the circuit board provided on the lead extended edge, so that the leads are not subjected to bending force shifted from the extending direction, and the leads having low mechanical strength are free from damages. By connecting the leads to the circuit board, the leads are connected to the input/output terminal through the battery protection device by the connection circuit based on the conductive pattern formed on the board, and therefore the disadvantages associated with poor workability or insulation using wiring members such as wiring leads or metal plates for connecting the positive and negative electrodes of the plurality of rechargeable batteries are solved. By connecting the rechargeable batteries in parallel or series by the circuit board, the circuit as a battery pack is formed at well.

According to a third aspect of the invention, a battery power source device includes a plurality of rechargeable batteries stored in a pack case. The rechargeable battery stores a power generating element in an outer case made of a laminated sheet and is formed in a flat, approximately prismatic shape. The pack case includes upper and lower cases formed in a pair of halves, and the upper and lower cases have position restriction walls to restrict the position to store rechargeable batteries around the side surfaces of the plurality of rechargeable batteries. The lower case storing the plurality of rechargeable batteries is joined with the upper case between the position restriction walls and side peripheral walls for integrating both cases.

According to the third aspect of the invention, the sides of the rechargeable battery formed in a flat, prismatic shape are surrounded by the position restricting wall, and both flat surfaces are in abutment against the upper and lower cases. Consequently, impact or vibration does not cause the rechargeable battery to move, so that faults associated with such movement are prevented.

The surfaces of the upper case and/or the lower case in contact with the flat surfaces of the plurality of rechargeable batteries may be formed into an elastic deforming surface that is thinner than their periphery and that elastically deforms in accordance with a change in the thickness of the rechargeable battery.

According to a fourth aspect of the invention, a lead joining method includes the steps of providing a lead made of a metal foil on a land formed by a conductive pattern on a surface of a circuit board, supporting a back surface of the circuit board by an anvil of an ultrasonic welder, and abutting a welding tip against the lead and applying ultrasonic vibration to the welding tip as the tip presses toward the anvil, thereby connecting the lead to the land by ultrasonic joining.

According to the fourth aspect of the invention, the lead is connected to the land by ultrasonic joining using the welding tip, so that if the lead is of a material not suited for soldering, the lead is directly joined to the land. The use of a medium member for soldering is eliminated, thereby reducing wastes and the number of steps.

According to a fifth aspect of the invention, a battery power source device includes a rechargeable battery and a circuit board having a power source circuit including a battery protection circuit, and positive and negative electrode leads of a metal foil extended from the rechargeable battery are connected to prescribed lands formed by a conductive pattern on a surface of the circuit board by ultrasonic joining, respectively.

According to the fifth aspect of the invention, if a lead is of a material not suited for soldering, the lead is connected to the land on the circuit board by ultrasonic joining, and the use of a medium member for soldering is not necessary, thereby reducing wastes and the number of steps.

According to a sixth aspect of the invention, a battery power source device includes a lithium polymer rechargeable battery and a circuit board having at least a battery protection circuit thereon. The rechargeable battery stores a power generating element in an outer body made of a pair of laminated sheets that are thermally sealed at peripheries thereof. The rechargeable battery is formed in a plate shape whose positive and negative electrode leads are extended from a lead extended edge. The rechargeable battery and the circuit board are integrated, and the lithium polymer rechargeable battery is secured on a metal plate. A battery having a soft outer body prone to damages or deformation is secured to a metal plate for protection, which is particularly effective in integrating a plurality of batteries with a circuit board.

According to a seventh aspect of the invention, a battery power source device includes a rechargeable battery and a circuit board having a power source circuit. The rechargeable battery stores a power generating element in an outer case made of a pair of laminated sheets having their peripheries sealed by welding and is formed in a flat, approximately prismatic shape. Positive and negative electrode leads of the battery are extended from a lead extended edge sealed by welding. The positive and negative electrode leads are connected in prescribed positions on the circuit board, respectively, and the circuit board is provided on the lead extended edge and attached and secured to the rechargeable battery by an adhesive sheet. Since the circuit board is provided in a space at the lead extended edge of the rechargeable battery and secured by an adhesive sheet, the circuit board and the rechargeable battery are integrated in the power source device without increasing the volume of the rechargeable battery.

According to an eighth aspect of the invention, a rechargeable battery stores a power generating element in an outer case made of a pair of laminated sheets having their peripheries sealed by welding and is formed in a flat, approximately prismatic shape. Positive and negative electrode leads of the battery are extended from a lead extended edge sealed by welding. A double-faced adhesive sheet to secure the rechargeable battery in a prescribed position is attached on a flat surface of the rechargeable battery. A lining sheet of the double-faced adhesive sheet has a part on the backside that is not provided with an adhesive at an arbitrary side of the adhesive sheet. Since the lining sheet is readily removed, the outer case of the rechargeable battery is prevented from being damaged or scarred.

According to a ninth aspect of the invention, a battery power source device includes a rechargeable battery and a circuit board. The rechargeable battery stores a power generating element in an outer case made of a pair of laminated sheets having their peripheries sealed by welding and is formed in a flat, approximately prismatic shape. Positive and negative electrode leads of the battery are extended from a lead extended edge sealed by welding. The circuit board has a land to which each of the positive and negative electrode leads is joined by ultrasonic welding. The rechargeable battery and the circuit board are positioned and provided such that the leads are bent at the time of the ultrasonic welding and securing to a prescribed position. Since the leads are bent, when vibration or impact is applied, the amplitude is absorbed by the bent portion and the leads having small strength are prevented from being broken.

BRIEF DESCRIPTION OF THE DRAWINGS

FIG. 1A is an overview, and FIG. 1B is a perspective view as a pack case is open;

FIG. 2A is a plan view showing how an outer case is sealed, FIG. 2B is a side view, and FIG. 2C is a plan view of the finished state;

FIG. 3 is a plan view of a lower case;

FIG. 4A is a plan view of the front surface side, FIG. 4B is a plan view of the back surface side, and FIG. 4C is a side view;

FIGS. 11A and 11B show how a rechargeable battery is stored in the pack case, FIG. 11A is a sectional view taken along the width of the rechargeable battery and FIG. 11B is a sectional view taken along the length of the rechargeable battery;

FIG. 12 is a plan view of the outer surface side of the lower case;

FIGS. 14A and 14B show how the rechargeable batteries and a circuit board forming a battery pack are connected, FIG. 14A is a plan view, and FIG. 14B is a sectional view taken along the line XIVB—XIVB of FIG. 14A;

FIGS. 15A and 15B show the structure of a battery pack, FIG. 15A is a plan view and FIG. 15B is a sectional view taken along the line XVB—XVB of FIG. 15A;

FIG. 16A is a plan view of the front surface side, FIG. 16B is a plan view of the back surface side, and FIG. 16C is a side view;

FIG. 17 is a plan view of a battery pack;

FIGS. 23A and 23B show a display panel mounted with a battery pack, FIG. 23A is a plan view, and FIG. 23B is a sectional view taken along the line XXIIIB—XXIIIB of FIG. 23A;

FIG. 24 is an enlarged sectional view of the display panel;

FIG. 25A is a plan view, FIG. 25B is a side view of the rear end side, and FIG. 25C is a side view;

FIGS. 26A to 26D show a battery pack according to a fourth embodiment, FIG. 26A is a front view, FIG. 26B is a side view, FIG. 26C is a rear view, and FIG. 26D is a bottom view;

FIG. 27A is a plan view, and FIG. 27B is a side view of how the circuit board is provided;

FIG. 29A is a front view, FIG. 29B is a side view, FIG. 29C is a rear view, and FIG. 29D is a bottom view;

FIG. 31A is a front view, FIG. 31B is a side view, FIG. 31C is a rear view and FIG. 31D is a bottom view;

FIG. 33A is a side view at the time of joining, and FIG. 33B is a side view at the time of incorporating the board onto the rechargeable battery;

FIG. 34A is a plan view, and FIG. 34B is a side view.

BEST MODES FOR CARRYING OUT THE INVENTION

Embodiments of the present invention will now be described with reference to the accompanying drawings for a better understanding of the invention. Note that the following embodiments are specific examples of how the invention is embodied and should not be construed as anything limiting the technological scope of the invention.

Figure 1A:
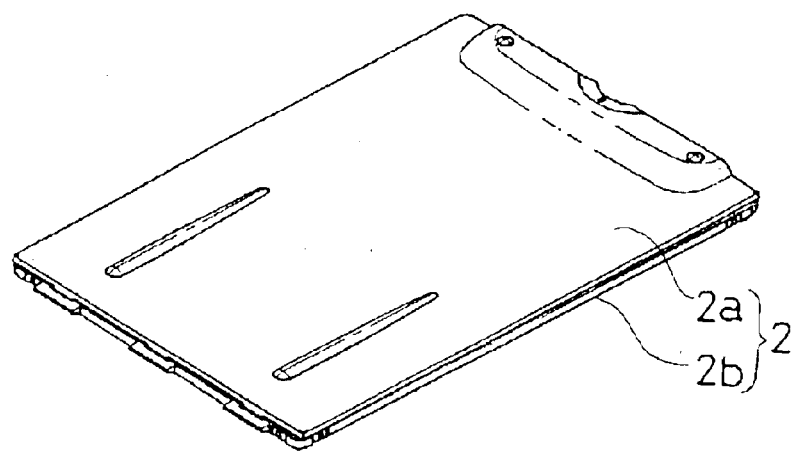
FIGS. 1A and 1B show a battery pack according to an embodiment of the invention.
Figure 1B:
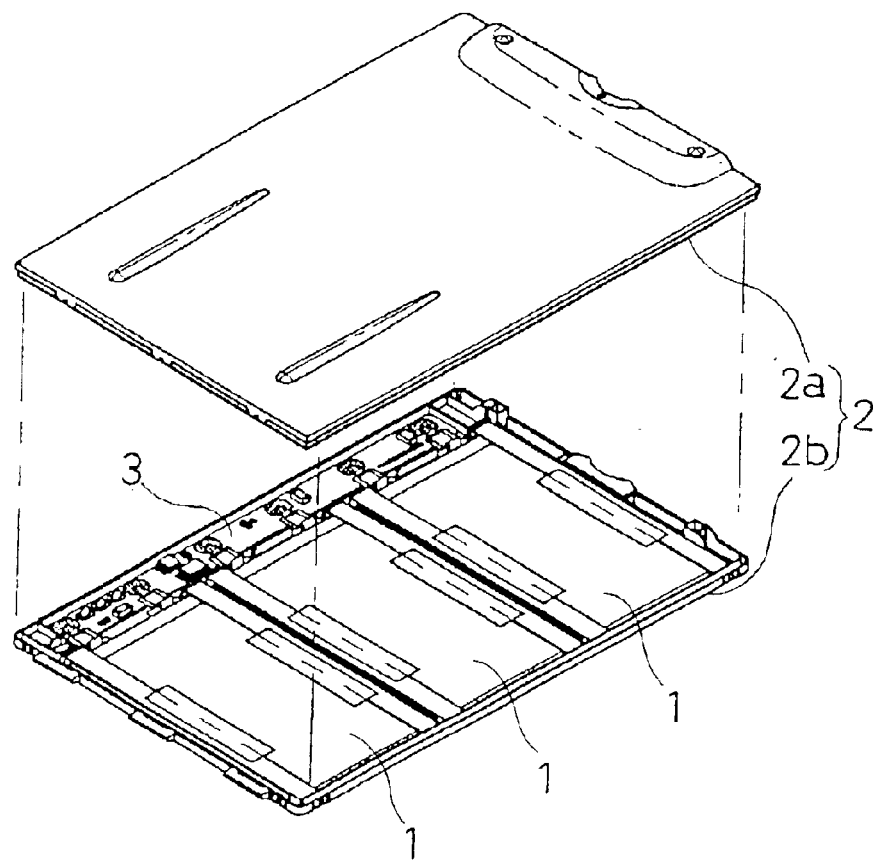

According to a first embodiment of the invention, a battery back includes an arrangement of three rechargeable batteries 1 connected in parallel. The rechargeable battery 1 stores a power generating element in an outer case made of a laminated sheet. As shown in FIG. 1B, three rechargeable batteries 1 and a circuit board 3 are stored in a lower case 2b of a pack case 2, and an upper case 2a is joined to the lower case 2b to constitute a flat battery pack as shown in FIG. 1A.

Figure 2A:
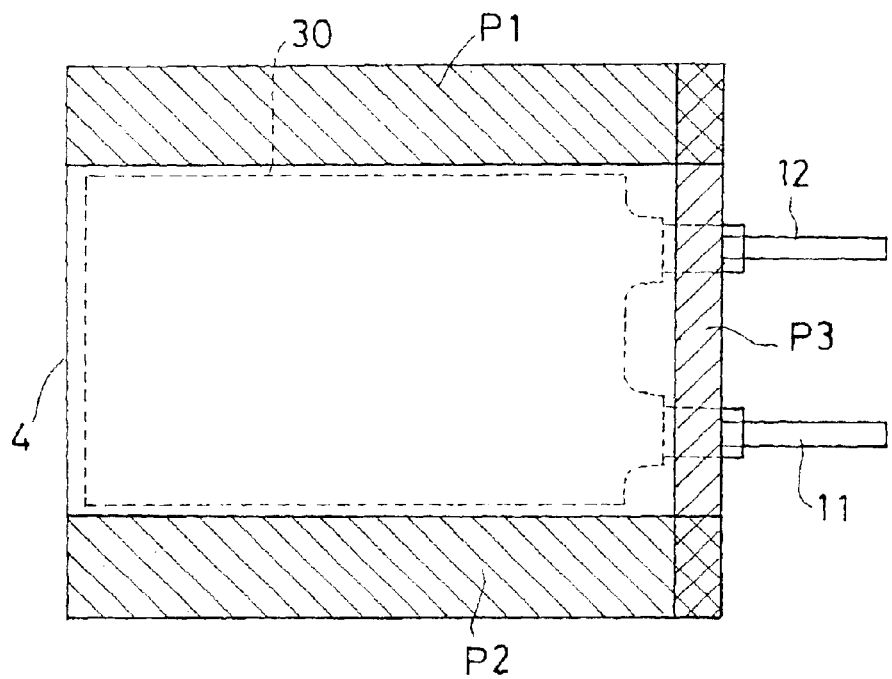
FIGS. 2A to 2C show the structure of a rechargeable battery.
Figure 2B:
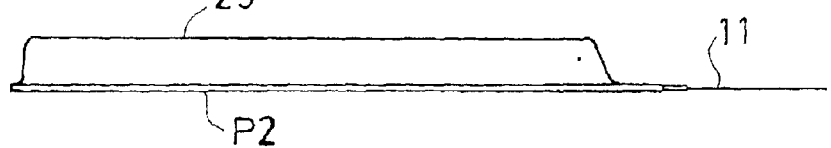
Figure 2C:
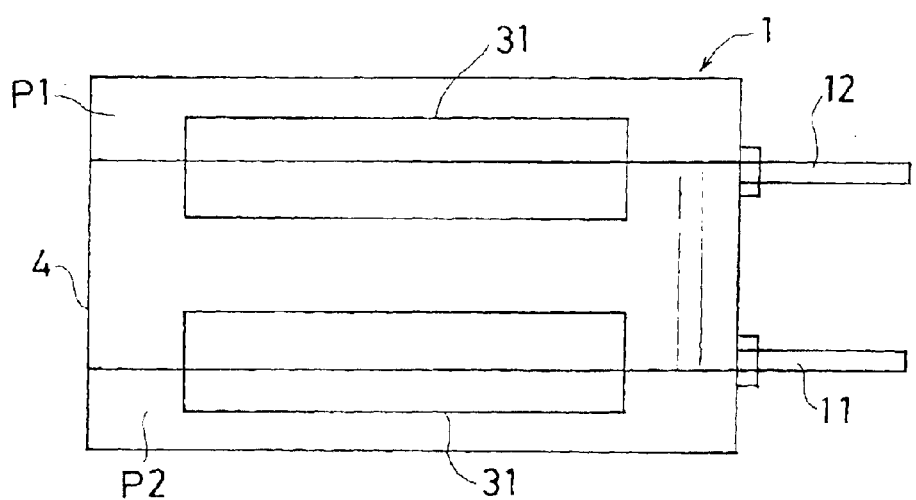

The rechargeable battery 1 is a lithium polymer rechargeable battery, and has as an outer body of a laminated sheet produced by covering both surfaces of a metal layer with a plurality of resin layers. As shown in FIG. 2B, a power generating element is stored in a recess 29 formed at one side of the laminated sheet to be folded into two. As shown in FIG. 2A, three seal edges P1, P2, and P3 are thermally sealed to form an outer case 4, positive and negative electrode leads 11 and 12 connected to positive and negative electrode plates, respectively of layered electrode plates 30 forming the power generating element are extended outside from the seal edge P3 of the outer case 4. The seal edges P1 and P2 on both sides of the outer case 4 are folded and secured with an adhesive tape 31 on the flat surface as shown in FIG. 2C, so that the width is reduced.

Figure 5:
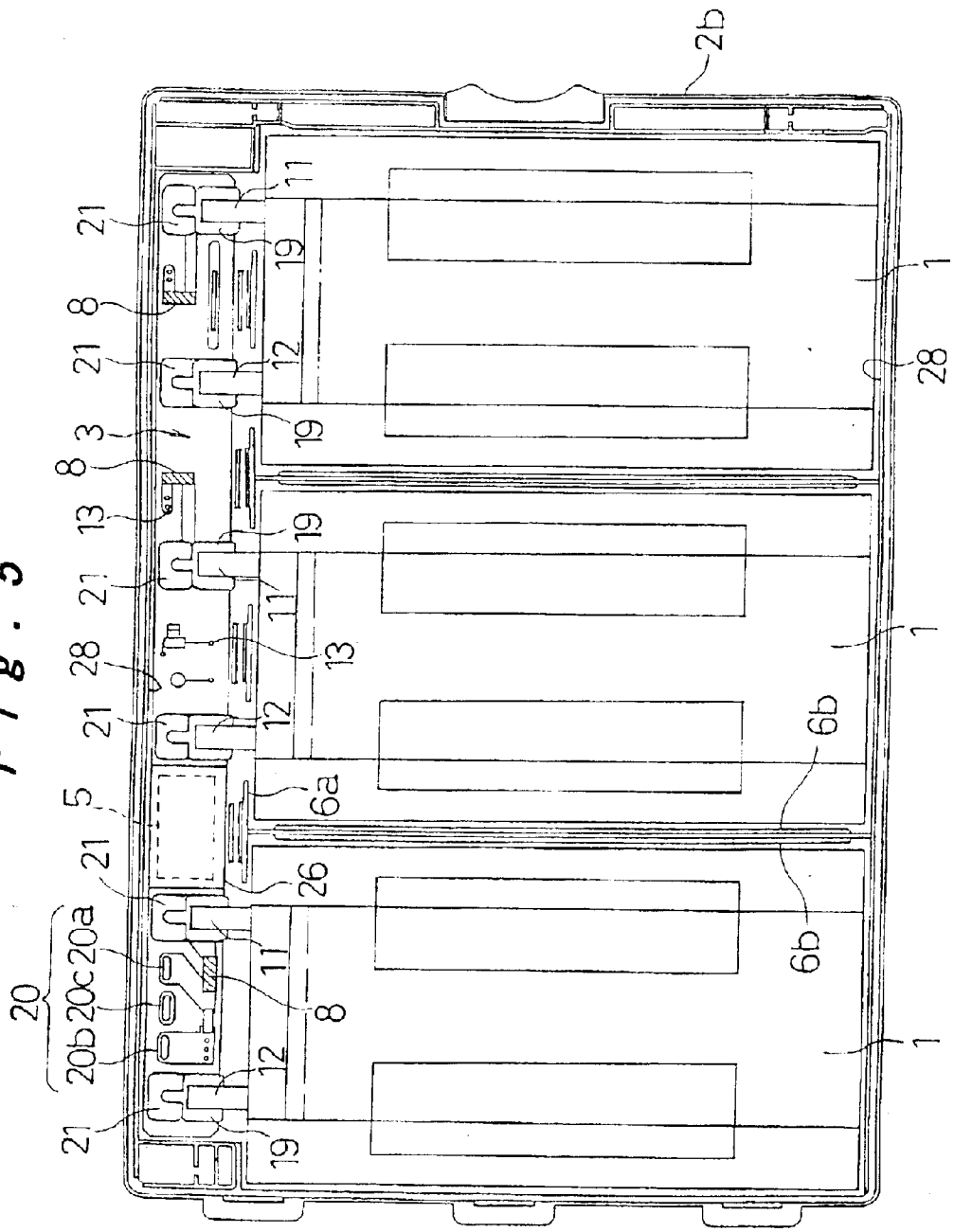
FIG. 5 is a plan view showing how the circuit board and rechargeable batteries are connected.

As shown in FIG. 3 and FIG. 5, the rechargeable batteries 1 are provided in the space surrounded by battery positioning ribs 6a and 6b and an inner circumferential wall 28 formed in the lower case 2b such that the positive and negative electrode leads 11 and 12 are directed to the circuit board 3. The rechargeable batteries are thus positioned and secured in a prescribed position in the pack case 2 as the upper case 2a is joined to the lower case 2b as will be described.

Figure 4A:
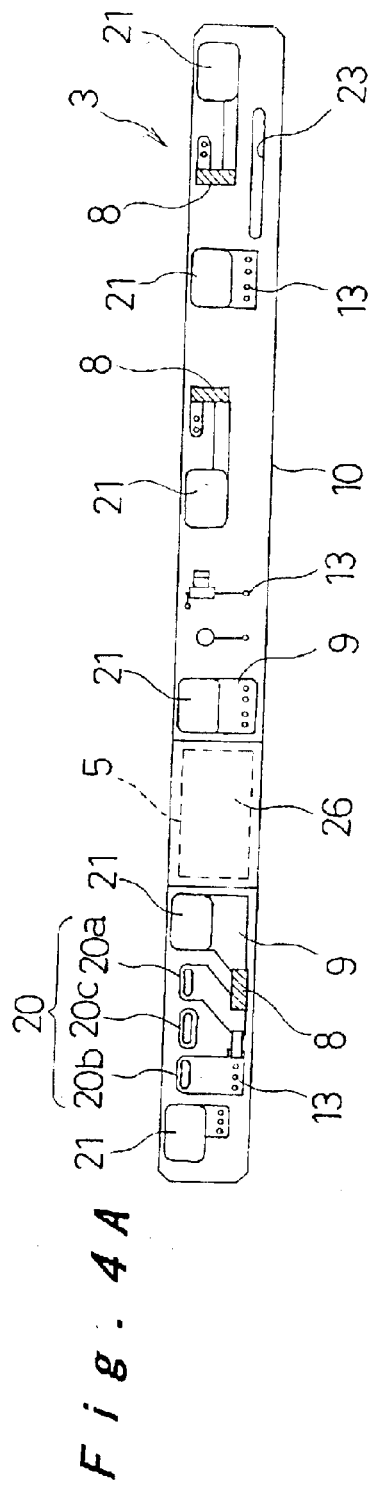
FIGS. 4A to 4C show the configuration of a circuit board.
Figure 4B:
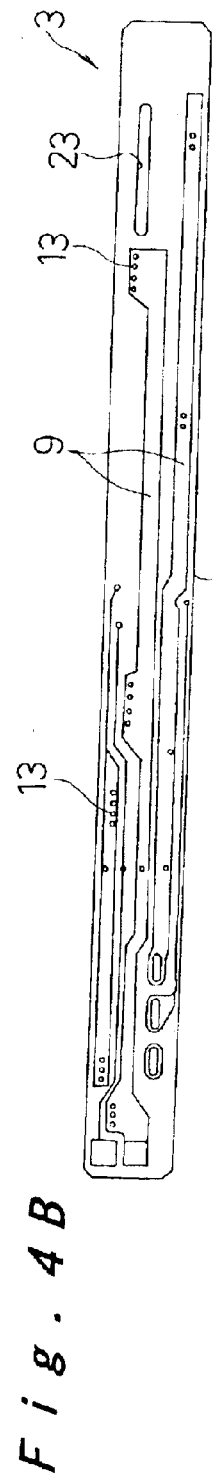
Figure 4C:
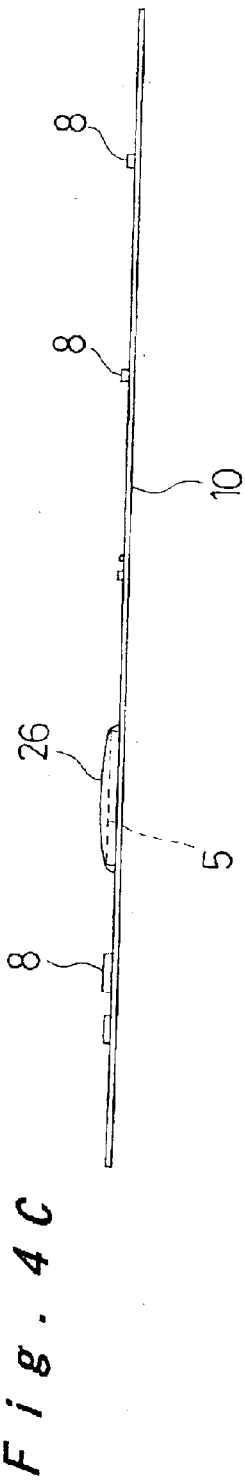

The circuit board 3 is positioned in the space surrounded by substrate positioning ribs 7a and 7b formed on the lead extended edge of the rechargeable batteries 1 and the inner circumferential wall 28. The substrate positioning ribs 7a and the inner circumferential wall 28 position the circuit board 3 by surrounding the board. As shown in FIGS. 4A to 4C, when the circuit board 3 is provided on the lower case 2b, the substrate positioning rib 7b is fitted into an elliptical positioning hole 23 formed in a substrate 10, so that the circuit board 3 is held not to be shifted in the position.

As shown in FIGS. 4A to 4C, the circuit board 3 has a conductive pattern 9 on both surfaces of the substrate 10, and the patterns on the front and back surfaces are connected by through holes 13 located in prescribed positions. Thus, a connection circuit for connecting electronic parts provided on the substrate 10 with a circuit and for connecting the three rechargeable batteries 1 in parallel is formed.

As shown in FIG. 5, the circuit board 3 is connected with the positive and negative electrode leads 11 and 12 of the three rechargeable batteries 1. In FIG. 5, the positive and negative electrode leads 11 and 12 of each rechargeable battery 1 have their tip end ultrasonic-welded with a connection member 19 made of a nickel plate, and the connection member 19 is then soldered to a soldering land 21 made of the conductive pattern 9 on the substrate 10. Thus, the three rechargeable batteries 1 are connected to the circuit board 3. The connection member 19 is used because connection strength greater than that by the ultrasonic welding that might adversely affect the protection circuit at the time of welding or the spot welding that might damage the mechanically weak foil type leads. In addition, this is because soldering could readily be accomplished.

In connecting the positive and negative electrode leads 11 and 12 to the circuit board 3, the soldering lands 21 corresponding to the positive and negative electrode leads 11 and 12 are both in the lead extending direction on the same plane on the substrate 10. Thus, when the circuit board 3 is provided on the lower case 2b and the rechargeable battery 1 is provided, the connection members 19 connected to the positive and negative electrode leads 11 and 12 of rechargeable batteries 1 are positioned on the soldering lands 21. Consequently, the operation of soldering the positive and negative electrode leads 11 and 12 to the circuit board 3 is readily accomplished. Since the positive and negative electrode leads 11 and 12 are connected to the circuit board 3 in their extending direction, the positive and negative electrode leads 11 and 12 made of a foil and with little mechanical strength are free from force in the bending or torsional direction, and damages such as breaks and bends are prevented. Note that according to the described embodiment, the connection member 19 is used, while other methods such as directly connecting the negative electrode leads 12 of copper for example to the soldering lands 21 on the circuit board 3 may be employed. In this connection manner, the conductive pattern 9 for connecting the plurality of rechargeable batteries 1 is formed on the back surface of the circuit board 3, and the soldering lands 21 for connecting the positive and negative electrode leads 11 and 12 of each rechargeable battery 1 are formed on the surface of the circuit board 3, while the opposite electrodes are separated both two- and three-dimensionally by the substrate 10. This arrangement is effective in keeping the insulation between the positive and negative electrodes, and an additional insulating member is eliminated.

Since the plurality of rechargeable batteries 1 are connected on the circuit board 3, an wiring member such as metal plate used for connection with a circuit formed on the circuit board 3 according to the conventional technique is no longer necessary, which reduces the number of necessary elements and the workability is improved.

Figure 6:
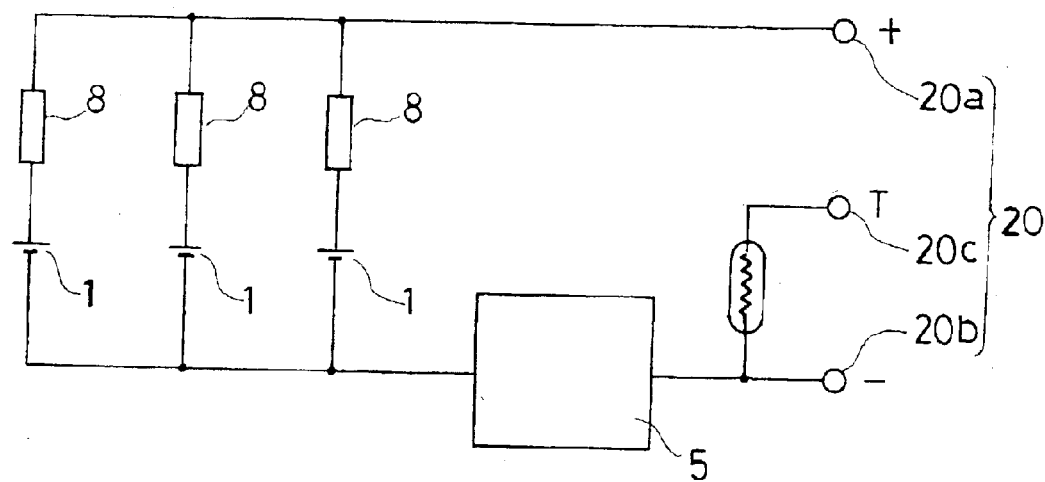
FIG. 6 is a circuit diagram of electrical connection for a battery pack.

As in the circuit diagram in FIG. 6, by connecting the rechargeable batteries 1 to the circuit board 3 in the above-described manner, the rechargeable batteries 1 are connected in parallel as they are each connected in series with an overcurrent protection element 8, and the parallel connection of the three rechargeable batteries 1 is connected to a connection terminal 20 through a protection circuit 5.

The overcurrent protection element 8 fuses to protect each rechargeable battery 1 against damages when overcurrent is passed through the rechargeable battery 1. The protection circuit 5 includes a plurality of electronic parts including IC parts provided collectively in a prescribed position on the substrate 10, and serves to protect the rechargeable batteries 1 against an abnormal state for a battery pack such as overcharge and overdischarge by disconnecting the input/output circuit in response to such an abnormal state. The protection circuit 5 has their elements provided collectively in a prescribed position, and thus can be coated with a resin mold 26 in one location as shown in FIGS. 4A and 4C. A battery protection device includes these overcurrent protection element 8 and protection circuit 5 and prevents the rechargeable batteries 1 from being damaged by failure or erroneous operation or wrong use of the device connected to the battery pack.

The overcurrent protection element 8 has two protection functions. The first function is to discharge considerably large discharge current from the rechargeable batteries 1 when the protection circuit 5 is defective or damaged for example by short-circuit and the region between the positive and negative input/output terminals is short-circuited by some extraneous cause. The overcurrent protection element 8 fuses to prevent excessively large current. The second function is a protection function when one of the rechargeable batteries 1 connected in parallel is internally short-circuited. The internal short circuit refers not only to the condition caused by simple defects in the battery but also to that caused by abnormal handling. When, for example, a rechargeable battery 1 is pierced with a sharp metal piece, current comes into the rechargeable battery 1 from the other rechargeable batteries 1. Thus, large current concentrates to this rechargeable battery 1, which would result in danger if the concentration continues. Since the rechargeable batteries 1 are each connected in series with the overcurrent protection element 8, such large current is prevented from entering.

As the overcurrent protection element 8, an overcurrent fusing type fuse tip is suitably provided to the circuit board 3, and is provided near each of the rechargeable batteries 1. A PTC (Positive Temperature Coefficient) element can be used for overcurrent protection.

As shown in FIG. 3, an external input/output terminal 25 including a positive input/output terminal 25a, a negative input/output terminal 25b, and a temperature detecting terminal 25c is provided at the lower case 2b as the contact surfaces are exposed to the outside. The terminals 25a, 25b, and 25c are respectively joined with a positive lead plate 22a, a negative lead plate 22b, and a temperature detection lead plate 22c forming a lead plate 22. Each one end of the terminals is under the position to provide the circuit board 3. When the circuit board 3 is provided on the lower case 2b, the corresponding ends of the lead plate 22 are inserted to holes of a positive connection terminal 20a, a negative connection terminal 20b, and a temperature detection connection terminal 20c forming the connection terminal 20 on the circuit board 3. Thus, the lead plate 22 and the connection terminal 20 are connected by soldering and the circuit board 3 is thus connected to the external input/output terminal 25. In this way, charge/discharge to/from the rechargeable batteries 1 is performed through the circuit board 3 from the external input/output terminal 25.

After all the elements are stored in the lower case 2b as described above, the upper case 2a is joined to the lower case 2b by ultrasonic joining as shown in FIGS. 1A and 1B, and a battery pack including the plurality of rechargeable batteries 1 enclosed in the pack case 2 is provided. How the lower and upper cases 2a and 2b are joined will now be described.

Figure 8:
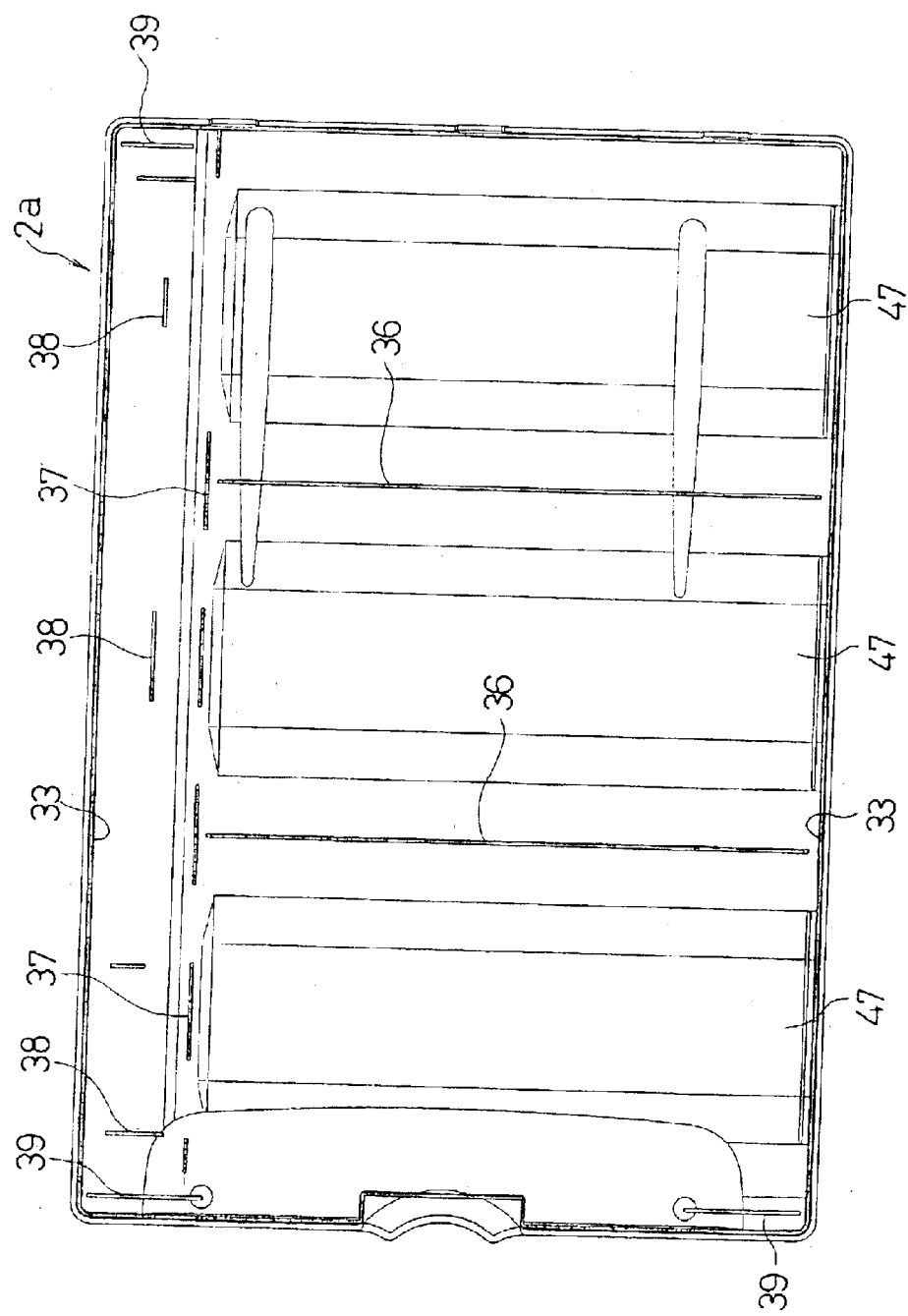
FIG. 8 is a plan view of the inner surface side of the upper case.

As shown in FIG. 8, the upper case 2a is provided with a side circumferential rib 33 fitted into a side circumferential groove 34 formed between the inner and outer circumferential walls 28 and 27 of the lower case 2b, battery holding ribs 36 fitted into battery holding grooves 35 formed between the battery positioning ribs 6b formed at the lower case 2b, lead edge holding ribs 37 fitted between the battery positioning ribs 6a and the substrate positioning ribs 7a formed at the lower case 2b, and substrate pressing ribs 38 for restricting the position of the circuit board 3 in the thickness-wise direction. Positioning ribs 39 formed at three corner positions fit with positioning portions 40 formed at the lower case 2b.

Figure 9:
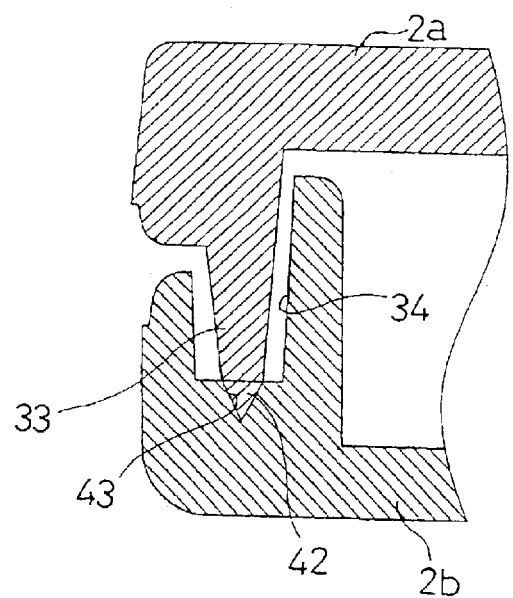
FIG. 9 is a sectional view showing how the upper and lower cases are fitted at their peripheries.
Figure 10:
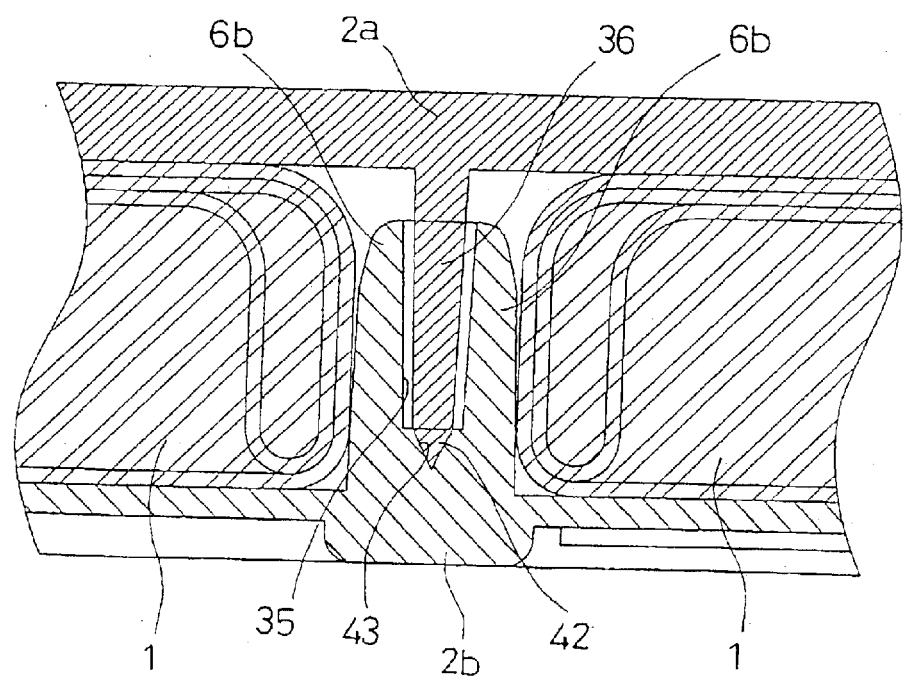
FIG. 10 is a sectional view showing how the upper and lower cases are fitted between batteries.

The positioning ribs 39 are inserted into the positioning portions 40 at the lower case 2b to position the upper case 2a to the lower case 2b. Then, as shown in FIG. 9, when the upper case 2a is pressed toward the lower case 2b, the side circumferential rib 33 is fitted into the side circumferential groove 34, while as shown in FIG. 10, the battery holding rib 36 is fitted into the battery holding groove 35 and the lead edge holding rib 37 is fitted between the battery positioning rib 6a and the substrate positioning rib 7a, so that a V-shaped rib 42 formed at the rib tip is fitted into a V-shaped groove 43 formed at the bottom of the groove. In this state, the upper and lower cases 2a and 2b are held and pressed between the horn of a ultrasonic welder and a receiving jig, and provided with ultrasonic vibration by the horn. Then, the upper and lower cases 2a and 2b are welded between the V-shaped rib 42 and the V-shaped groove 43. In this way, the upper and lower cases 2a and 2b are fitted as the recess and the raised portion are fitted with one another, so that the positioning is surely performed and the rigidity of the pack case 2 is improved as well. Since the tip end of the raised portion is joined by ultrasonic welding at the bottom of the recess, the joint is not exposed to outside, and this processing is performed not only in the periphery but also in positions surrounding the plurality of rechargeable batteries 1.

Consequently, the strength against the torsion or bending of the pack case 2 is improved. When stress is applied upon the joint of the upper and lower cases 2a and 2b by impact caused when the product is dropped for example, the recess deforms prior to the other part, the deformation is held by the recessed portion, and therefore the rechargeable batteries 1 is less affected. Since the resin fused at the time of welding is rigidly attached at the bottom of the recess, the fused resin does not come out from the joint surface and stick to the rechargeable batteries 1.

FIGS. 11A and 11B show how the rechargeable batteries 1 are stored in the pack case 2. FIG. 11A is a sectional view taken along the width of the rechargeable battery 1 and FIG. 11B is a sectional view taken along the length of the rechargeable battery 1. As shown, the part of the lower case 2b in contact with the flat surface of the rechargeable battery 1 is formed into a thin, elastic deforming surface 44. FIG. 12 is a plan view of the lower case 2b seen from the outside showing the state of how the elastic deforming surface 44 is formed. The elastic deforming surface 44 is formed to be thin in a position a step H lower than the periphery and elastically deforms while keeping the flat surface when the thickness of the rechargeable battery 1 changes by expanding. The elastic deforming surface 44 is attached with a thin stainless plate 45 to prevent the rechargeable batteries 1 from being pierced with an edge tool or the like and damaged. The thin stainless plate 45 has a projection 45a at a corner, which alleviates positioning of the plate when the plate is attached. The elastic deforming surface 44 has a part not covered at the four sides, so that the elastic deforming surface 44 is not prevented from deforming. Note that an elastic deforming groove 46 formed to be thin is provided to the rechargeable battery 1 provided where the external input/output terminal 25 is provided so that changes in the thickness of the rechargeable battery 1 is similarly addressed.

When the electrode plate is expanded by repetition of charge and discharge or changes with time, the rechargeable battery 1 having the outer case 4 made of a soft laminated sheet has its thickness evenly increased to press and raise the elastic deforming surface 44. The elastic deforming surface 44 deforms at its periphery and is raised within the step H as the central part is kept flat. By setting the step H corresponding to how much the rechargeable battery 1 changes in the thickness, the thickness of the battery pack is unaffected by the change in the thickness of the rechargeable batteries 1, and the device to mount the battery pack is also unaffected.

As shown in FIG. 11A, the expanded portion 47 is formed along the length of the rechargeable battery 1 at the inner surface of the upper case 2a. When the rechargeable batteries 1 are stored in the pack case 2, the batteries 1 are held between the expanded portion 47 and the elastic deforming surface 44. The elastic deforming surface 44 applies force on the rechargeable batteries 1 in the contracting direction by its elasticity, so that the rechargeable batteries 1 are constantly under stress and the expansion of the electrode plate is restricted. A rechargeable battery 1 formed with the outer case 4 made of a soft material such as a laminated sheet has only small force to bind layers of electrode plate groups, and the layered electrode plates tend to shift in position in response to impact or vibration. However, the side surfaces are surrounded by the four edges and the stress is applied in the thickness-wise direction, so that the movement of the electrode plates is restricted.

Figure 7:
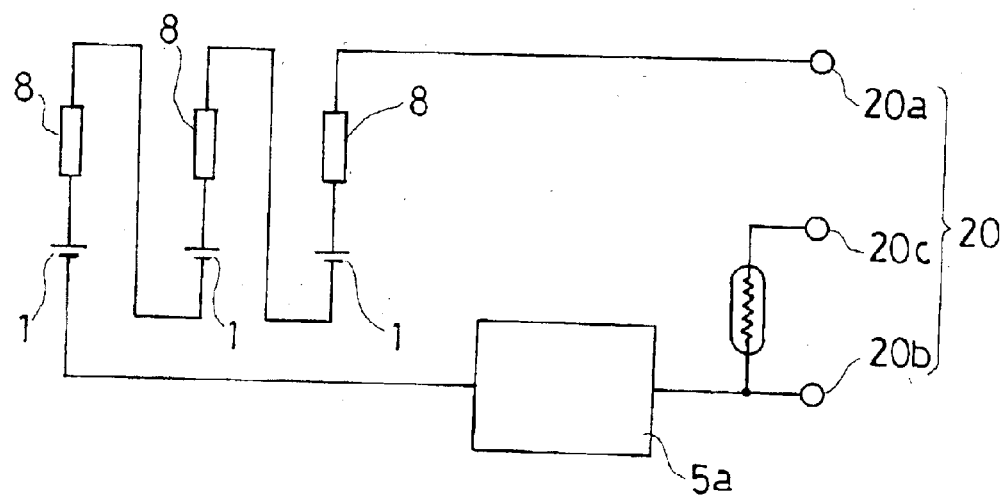
FIG. 7 is a circuit diagram when rechargeable batteries are connected in series.

In the foregoing arrangement, a plurality of rechargeable batteries 1 are connected in parallel to increase the battery capacity. Meanwhile, when relatively high voltage is required by a device to which the battery is to be applied, a plurality of rechargeable batteries 1 may be connected in series to the circuit board 3 as shown in the circuit diagram in FIG. 7. In the same battery pack arrangement, higher voltage is supplied.

Figure 13:
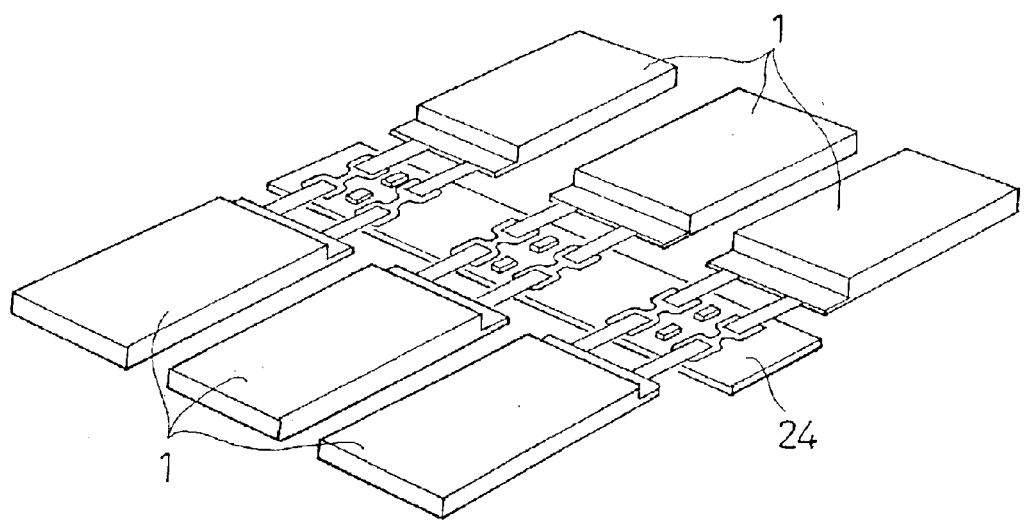
FIG. 13 is a perspective view of a battery pack including six rechargeable batteries connected in parallel.

When more rechargeable batteries 1 are connected in parallel, series, or series-parallel to obtain desired capacity or output voltage, as shown in FIG. 13, a plurality of rechargeable batteries 1 may be arranged on both sides of a circuit board 24. A plurality of rechargeable batteries 1 may be arranged in a single row, the circuit board 24 may be elongated accordingly, and a battery pack in a strip shape may be formed. In the final shape of the battery pack, a plurality of rechargeable batteries 1 need only be arranged corresponding to the device to be provided with the battery, so that various arrangements may be achieved corresponding to the device based on the above-described arrangement.

The arrangement having a plurality of rechargeable batteries 1 connected to the circuit board 3 is stored into the pack case 2 and formed into a battery pack as described above. Meanwhile, battery packs in an arrangement having a plurality of rechargeable batteries 1 connected to the circuit board 3 may be produced as separate products and may be supplied to the manufacturer of the devices.

As shown in FIGS. 14A and 14B, rechargeable batteries 1 are connected to a circuit board 70. The circuit board 70 has the same configuration as that of the circuit board 3, and the rechargeable batteries 1 are similarly connected in parallel. A connection terminal 20 of the circuit board 70 is connected with a connector 49 through a lead. The connector is used to connect the terminal to the device. As shown in FIGS. 15A and 15B, when the circuit board 70 is provided on the lead extended edge of the rechargeable batteries 1 after the batteries 1 and the circuit board 70 are connected, the volume of the battery pack is reduced, and the positive and negative electrode leads 11 and 12 of the rechargeable batteries 1 are prevented from being exposed and protected.

A battery pack in the arrangement as shown in FIGS. 15A and 15B is integrated by shrink-packing with a thin resin sheet or by securing with an adhesive or an adhesive tape, so that it is prevented from being damaged during handling or transfer to the device manufacturer. The battery pack is provided in a mounting position for the pack in the device, and attached in electrical connection with the device through the connector 49.

A second embodiment of the present invention will now be described. Similarly to the arrangement according to the first embodiment, a battery pack according to the second embodiment has a parallel connection of three rechargeable batteries 1 having a power generating element stored in an outer case made of a laminated sheet. In the arrangement according to the first embodiment, the positive and negative electrode leads 11 and 12 extended from the rechargeable battery 1 are connected to the circuit board 3 by ultrasonic-welding the connection member 19 made of a nickel plate to their tip ends and soldering the connection member 19 to the soldering land 21 of the circuit board 3. According to the second embodiment, the positive and negative electrode leads 11 and 12 are directly connected to the soldering land 21 by ultrasonic-welding, and this lead connection method will be described.

Figure 16A:
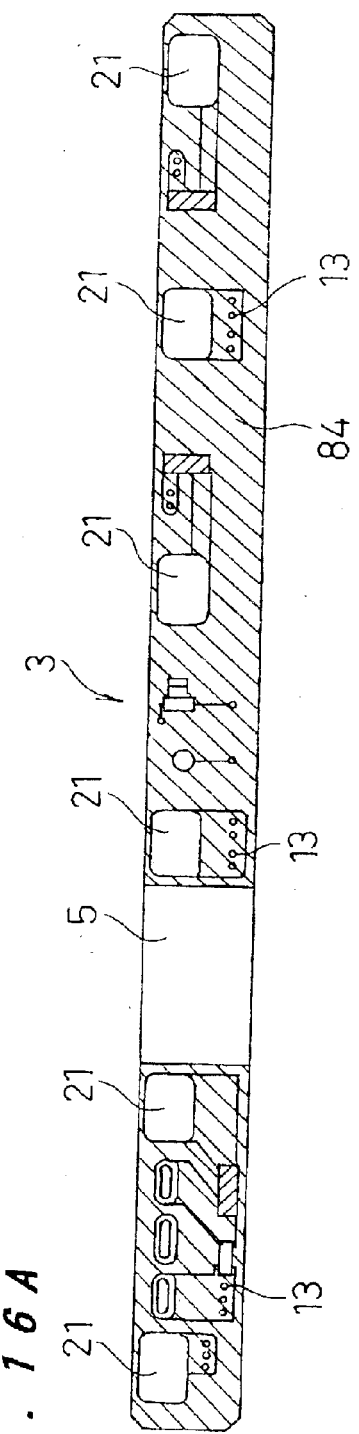
FIGS. 16A to 16C show the configuration of the circuit board.
Figure 16B:
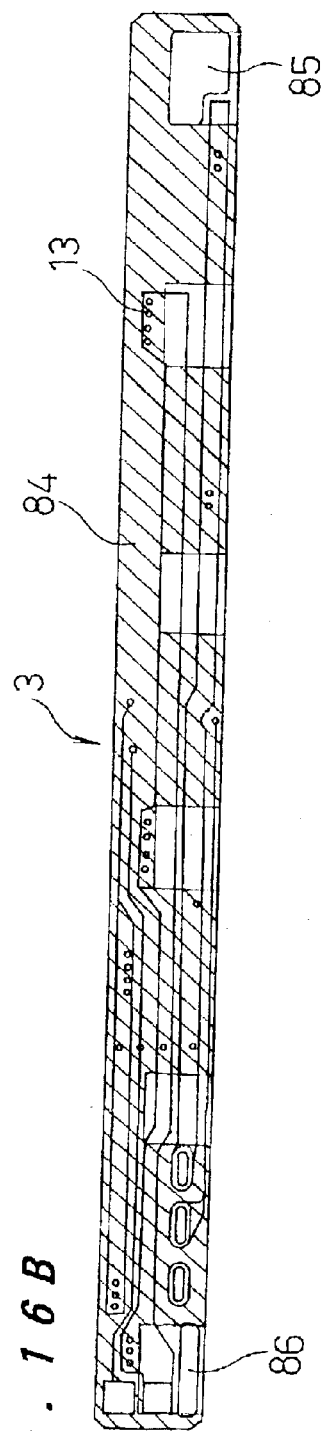
Figure 16C:
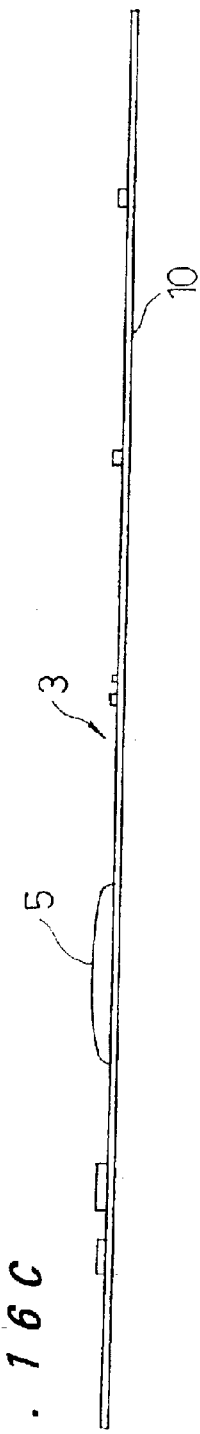

As shown in FIG. 16A, a circuit board 80 to which the positive and negative electrode leads 11 and 12 are directly connected has soldering lands 21 formed by a conductive pattern on the front surface side of a substrate 10, and electronic parts forming a battery protection circuit are provided. As shown in FIG. 16B, a connection pattern to connect three rechargeable batteries 1 in parallel is formed on the back surface side of the substrate 10, and the conductive patterns on the front and back surface sides are connected by through holes 13 in prescribed locations. As hatched in the figure, the part other than the soldering lands 21 and the soldering part on the front surface side is covered with solder resist 84. Similarly, on the back surface side, the part other than the backside position of the soldering lands 21 is covered with the solder resist 84. The part on the backside of the soldering lands 21 that is not necessary for forming the circuit has connection lands 85 and 86 by a conductive pattern. The front side covered with resin mold 5 has IC parts forming the battery protection circuit buried therein.

Figure 18:
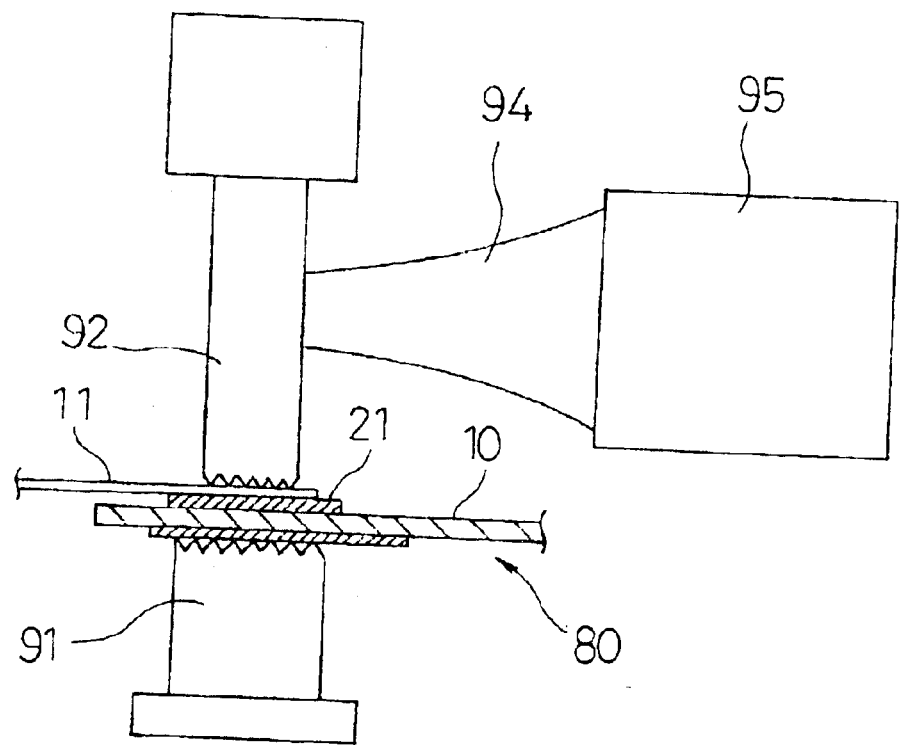
FIG. 18 is a schematic view showing a method of ultrasonic joining.

As shown in FIG. 17, the six soldering lands 21 formed at the circuit board 80 are connected with the positive and negative electrode leads 11 and 12 of the rechargeable batteries 1 by ultrasonic joining. As shown in FIG. 18, according to the ultrasonic joining, the circuit board 80 is provided on the anvil 91 of an ultrasonic welder, the positive electrode lead 11 is placed on and pressed against the soldering land 21 by prescribed pressure using a welding tip 92. In this state, ultrasonic vibration of a ultrasonic vibrator 95 is applied to the welding tip 92 through a horn 94, and then the friction at both contacting interfaces between the positive electrode lead 11 and the soldering land 21 destroys any oxide film on the surface and causes plastic deformation, so that newly generated metal surfaces are closely adhered. Local temperature rise caused by the frictional heat accelerates diffusion and re-crystallization of atoms, which results in a strong pressure-welded portion, so that the positive electrode lead 11 is connected with the soldering land 21. The negative electrode lead 12 is similarly joined to the soldering land 21 by the ultrasonic joining.

As described above, the backside part of the circuit board 80 in contact with the anvil 91 has a conductive pattern of a copper foil, so that the solder resist 84 is not applied on the surface. Then, the friction coefficient between the anvil 91 and the conductive pattern is large, and thus the slipping between the anvil 91 and the circuit board 80 is restricted when ultrasonic vibration is applied. Thereby, the vibrating time is reduced and efficient ultrasonic welding is achieved. If there is no such conductive pattern at the backside part of the circuit board 80 in contact with the anvil 91, the slipping caused between the substrate 10 and the anvil 91 prevents a stable joining from being provided because the substrate 10 made of a glass-cloth reinforced epoxy resin or the like has a hard and smooth surface.

The surface of the soldering land 21 is provided with a nickel plating as thick as 2 to 3 $\mu$m, and a gold plating having a thickness of about 0.05 $\mu$m is provided thereon. In this way, an oxide film hardly forms on the joint surface, and the close contact with the positive electrode lead 11 or the negative electrode lead 12 is achieved, which allows efficient ultrasonic joining.

Since the IC parts provided on the circuit board 80 are buried in the resin mold 5, damages by ultrasonic vibration applied upon the circuit board 80 are prevented.

Figure 19:
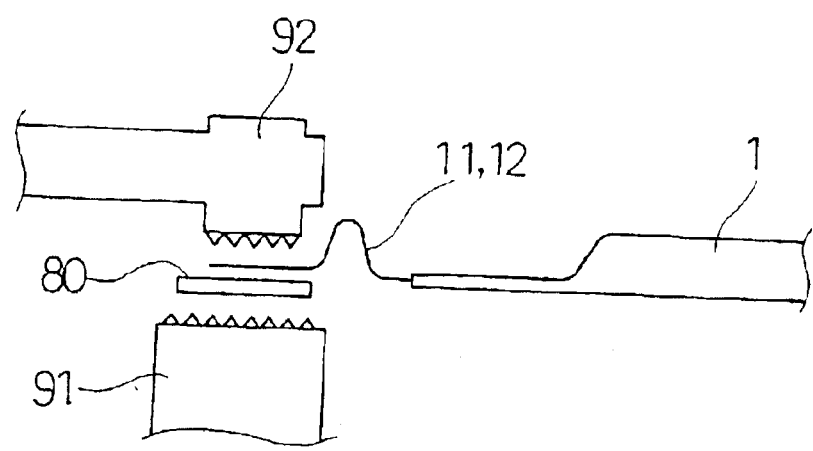
FIG. 19 is a schematic view illustrating how leads are processed at the time of ultrasonic welding.

When the above ultrasonic welding is performed, as shown in FIG. 19, the rechargeable batteries 1 are arranged so that the positive and negative electrode leads 11 and 12 are bent. When the positive and negative electrode leads 11 and 12 made of a low strength, metal foil are thus bent, they are prevented from being broken by the ultrasonic vibration.

More specifically, since the amplitude of the ultrasonic vibration is absorbed by the bent part of the positive and negative electrode leads 11 and 12, force applied in the tensile direction upon the leads 11 and 12 does not break them.

The three rechargeable batteries 1 having the positive and negative electrode leads 11 and 12 joined to the circuit board 80 by the ultrasonic joining and the circuit board 80 are stored in a prescribed position in the lower case 2b forming the pack case as shown in FIG. 17, and the lower case 2b is closed by the upper case 2a to form a battery pack.

A third embodiment of the present invention will now be described. A battery pack according to the embodiment can be mounted at the back surface of an LCD (Liquid Crystal Display) for a mobile personal computer.

Figure 20:
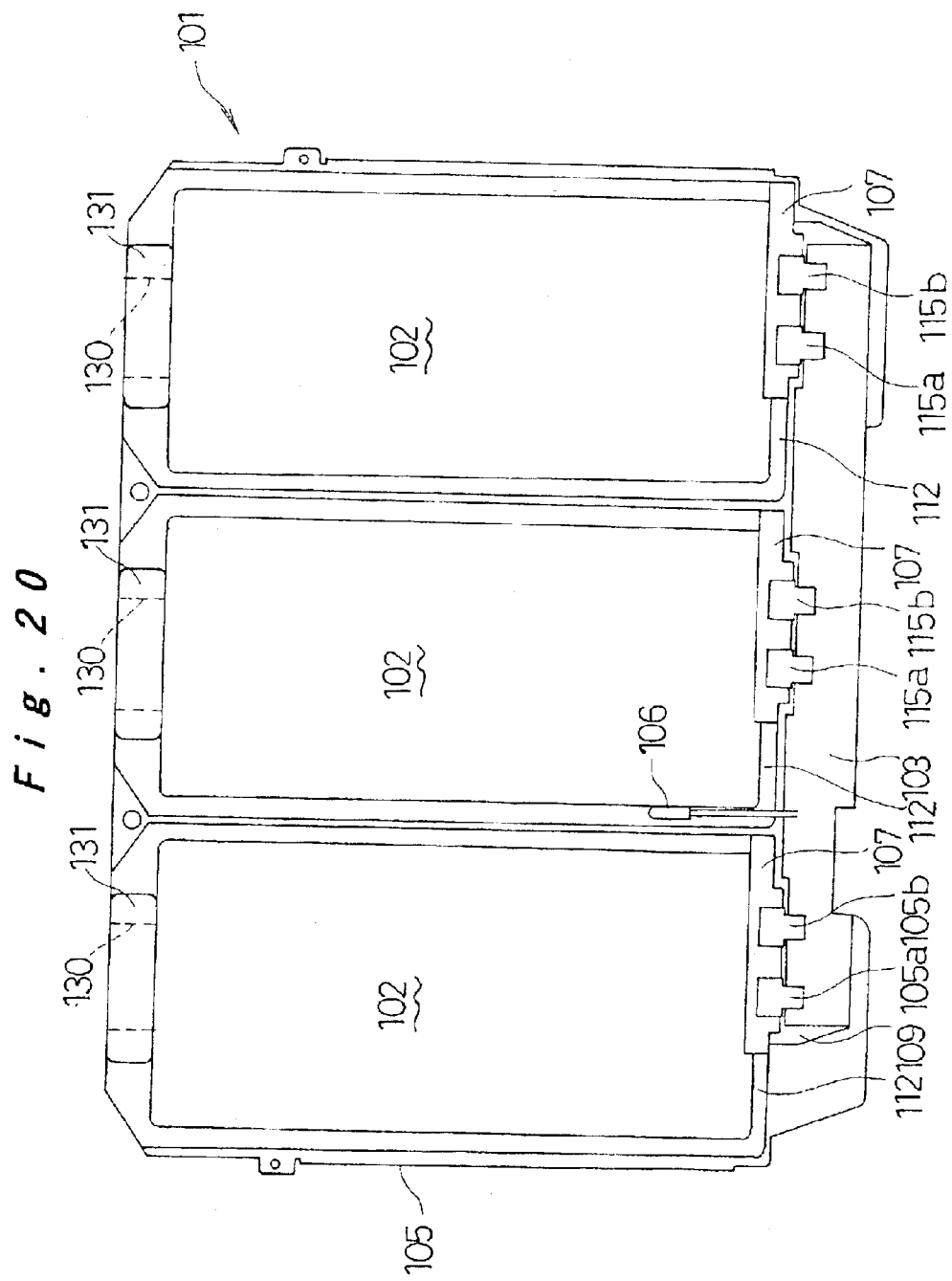
FIG. 20 is a plan view of the front surface side of a battery pack according to a third embodiment.

As shown in FIG. 20, a battery pack 101 according to the embodiment includes three rechargeable batteries 102 formed as a lithium polymer rechargeable battery, and a circuit board 103 including a battery protection circuit, a communication circuit for communication with the mobile computer, and the like. The rechargeable batteries 102 and the circuit board 103 are secured to an aluminum plate (metal plate) 105 and integrated.

Figure 21:
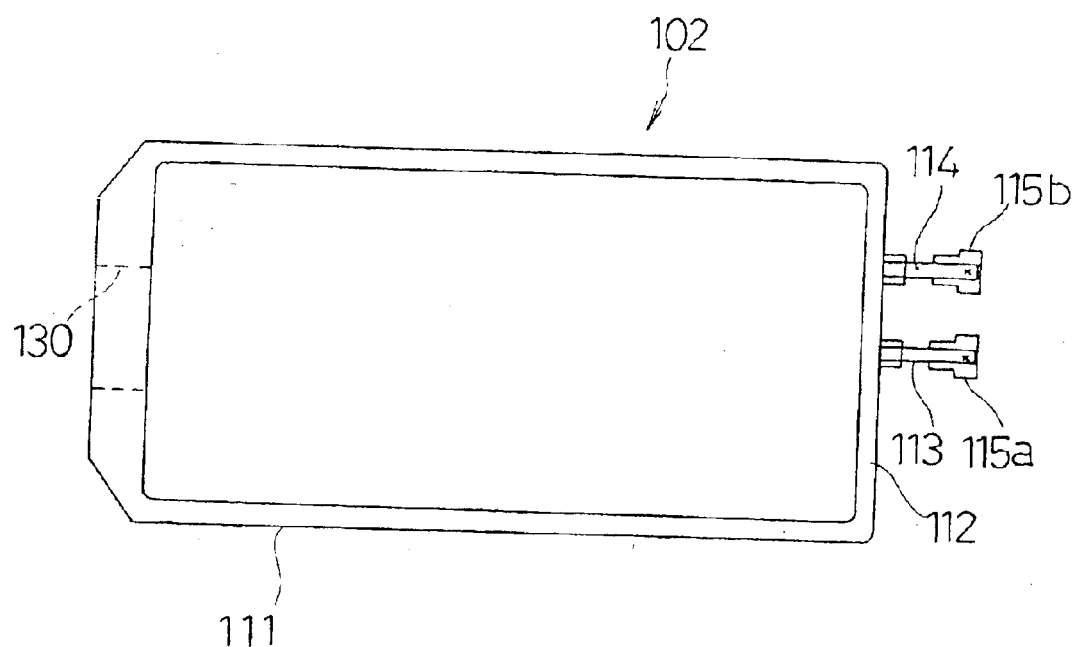
FIG. 21 is a plan view of a rechargeable battery.

As shown in FIG. 21, the rechargeable battery 102 is produced by storing and enclosing a power generating element in an outer body 111 by thermally sealing the peripheries, extending positive and negative electrode leads 113 and 114 to the outside from one lead extended edge 112 thermally sealed, and cutting the outer shape into a prescribed shape. The outer body 111 is made of a laminated sheet produced by joining a resin sheet to both sides of an aluminum foil. The positive electrode lead 113 is made of an aluminum foil, while the negative electrode lead 114 is made of a copper foil. In order to alleviate the connection to the circuit board 103 by soldering, connection plates 115a and 115b made of nickel are joined to the tip ends of the positive and negative electrode leads 113 and 114 by ultrasonic welding.

The rechargeable battery 102 is adhesively secured onto the aluminum plate 105 by a double-faced adhesive tape. At the time, an insulation coating is provided on the surface of the aluminum plate 105, or an insulating sheet is provided between the rechargeable battery 102 and the aluminum plate 105 for electrical insulation. The outer body 111 of the rechargeable battery 102 is made of a laminated sheet produced by joining a resin sheet on both sides of an aluminum foil as described above. The aluminum foil is exposed at the cutting end of the outer shape, and the exposed part is insulated by the insulation coating or by the insulating sheet so that it does not contact the aluminum plate 105.

Figure 22:
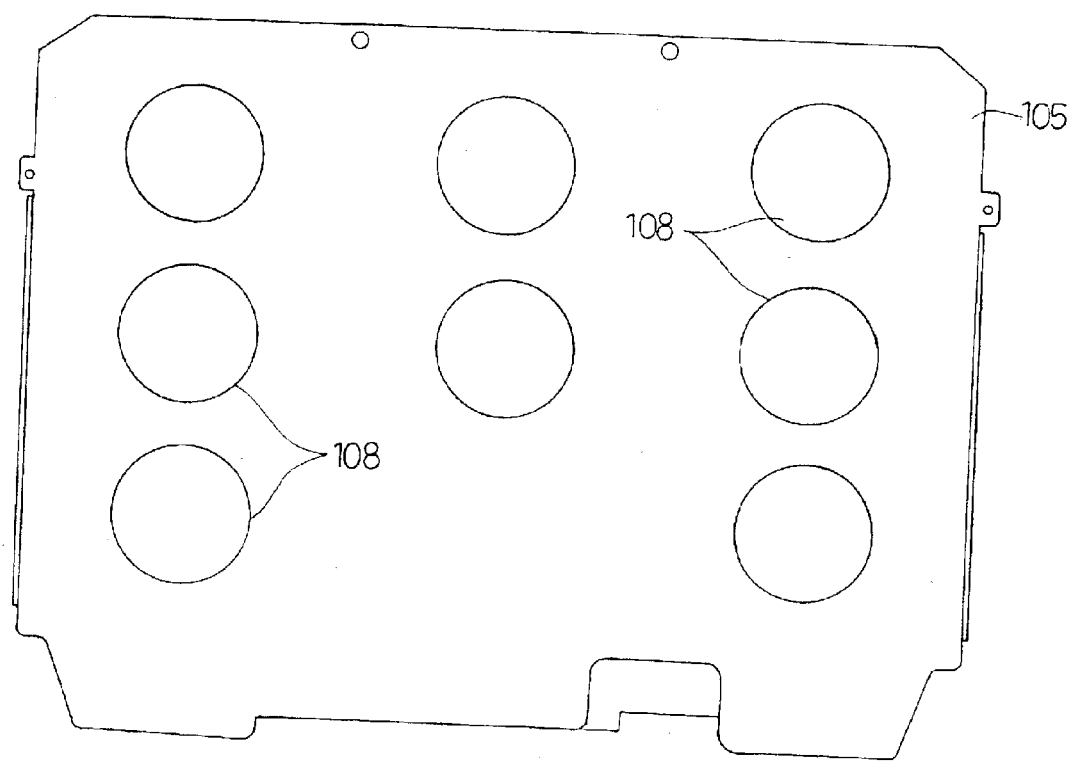
FIG. 22 is a plan view of the back surface side of the battery pack.

FIG. 22 shows the back surface side of the aluminum plate 105, and the adhesion surface of the rechargeable battery 102 has openings 108, so that the aluminum plate 105 is reduced in weight and that the temperature of the rechargeable batteries 102 is equalized. Thus, the rechargeable batteries 102 are secured to the aluminum plate 105, so that the rechargeable batteries 102 having the soft outer body 111 prone to damages or deformation are protected. Since the plurality of rechargeable batteries 102 and the circuit board 103 are integrated on the aluminum plate 105, the rigidity is improved as the thickness is reduced.

An upper end portion of the aluminum plate 105 is attached with an insulating paper sheet 109, on which the circuit board 103 is attached and secured. Soldering lands for connecting batteries (not shown) formed at the circuit board 103 are soldered with the connection plates 115a and 115b joined to the positive and negative electrode leads 113 and 114 of the rechargeable battery 102, respectively. A thermistor (temperature detecting sensor) 106 is secured to the corner of the part storing the power generating element of the rechargeable battery 102 where the seal edge is raised, the lead is connected to the circuit board 103, and the temperature of the battery is detected. Since the thermistor 106 is secured in the above-described position, the thermistor 106 detects the temperature of the battery by contacting the power generating element in a prescribed state through the outer body 111 even if the outer body 111 is expanded for some cause such as a gas generated in the outer body 111.

A liquid absorbing sheet 107 is adhered on the lead extended edge 112 of each rechargeable battery 102, and the connection plates 115a and 115b formed by folding the positive and negative electrode leads 113 and 114 are provided thereover. The lead extended edge 112 tends to have its sealing strength weakened as the positive and negative electrode leads 113 and 114 pass therethrough during thermal sealing, or a safety vent 130 to relieve increased internal pressure is provided, therefore the electrolyte solution could leak outside the outer body 111, and a liquid absorbing sheet 131 is provided in the position. As a result, the liquid absorbing sheets 107 and 131 absorb the leaking electrolyte solution if any, and consequently the device to which the battery pack 101 is mounted is not affected.

The battery pack 101 in the above arrangement is mounted in the display panel 117 of a mobile personal computer as shown in FIGS. 23A, 23B and 24. FIG. 23A is a view of the backside of the display panel 117, FIG. 23B is a sectional view taken along the line XXIIIB—XXIIIB, and FIG. 24 is an enlarged sectional view thereof. The open front surface of a box 119 for the display panel 117 is provided with an LCD 118, at the backside of which the battery pack 101 is provided with the aluminum plate 105 facing the backside.

Some elements of the LCD 118 generate heat, but the aluminum plate 105 of the battery pack 101 has a good heat transfer characteristic and therefore the heat is efficiently dissipated, while unbalanced temperature distribution i.e., temperature rise only in a part of the plurality of rechargeable batteries 102 is prevented. As shown in FIG. 22, the openings 108 formed in the aluminum plate 105 have their position and size set appropriately differently among locations with high temperature rise by extraneous causes such as the provision of the LCD 118 and the other locations. Thus, the temperatures of the plurality of rechargeable batteries 102 are equally maintained.

A fourth embodiment of the present invention will now be described. A battery pack according to the embodiment includes lithium polymer rechargeable batteries having an outer case made of a laminated sheet and a circuit board including a battery protection circuit for protecting the rechargeable battery against overcharge/overdischarge. The rechargeable batteries and the circuit board are integrally formed.

Figures 25A, 25B:
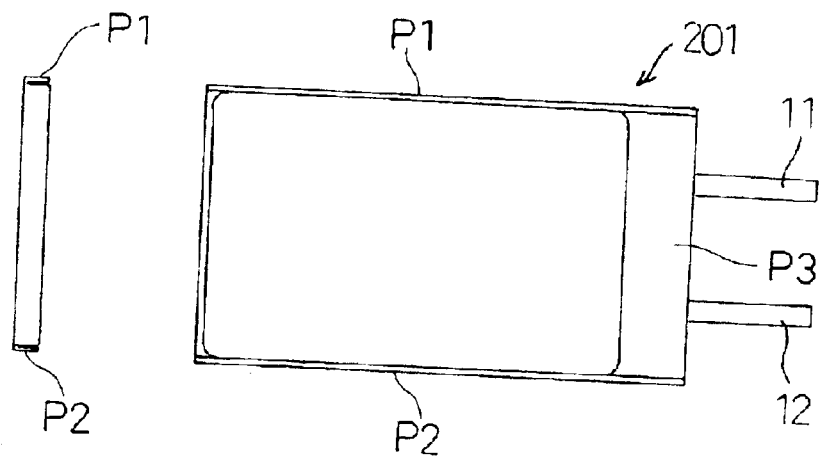
FIGS. 25A to 25C show the state of a rechargeable battery.
Figure 25C:
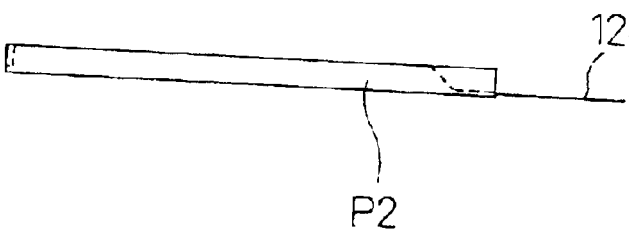

In FIGS. 25A to 25C, a rechargeable battery 201 is the same as the rechargeable battery 1 described in conjunction with the above embodiments, while seal edges are processed differently. As shown in FIG. 25B, the seal edges P1 and P2 on both sides are wound inside to reduce the width size and improve the sealing effect, and adapted to a battery pack.

FIGS. 26A to 26D show the structure of a battery pack A that includes two rechargeable batteries 201 having the above structure and a circuit board 206. The batteries and the circuit board are integrated, and a connector 209 to connect the battery pack A to the device to use the battery is extended from the circuit board 206. The process of how to assemble this battery pack will be described.

Figure 27A:
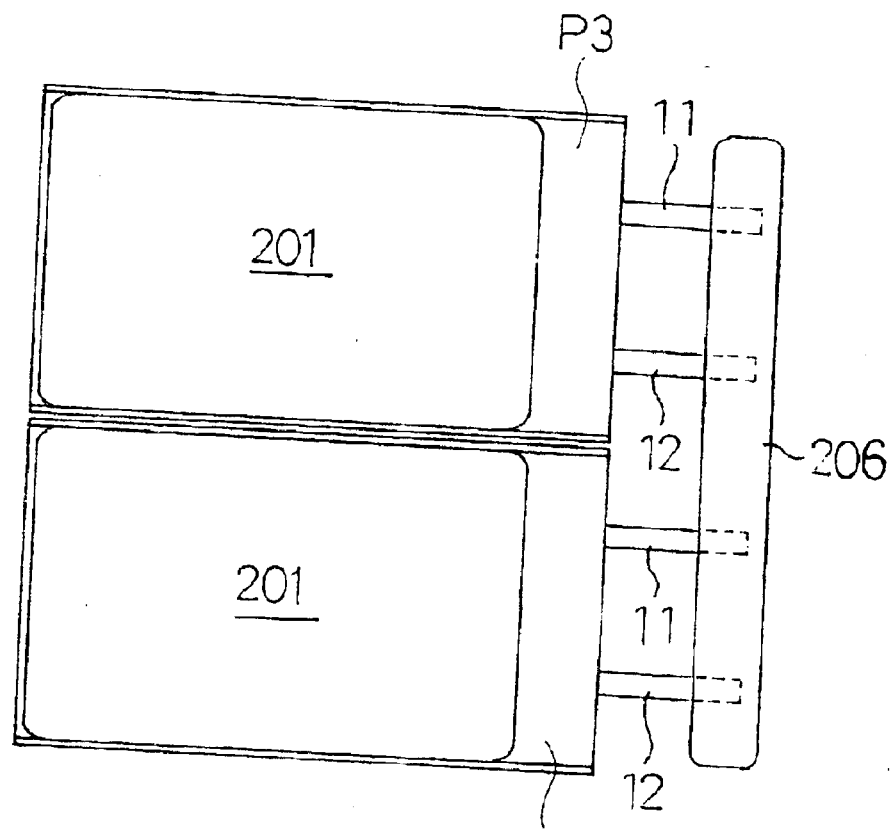
FIGS. 27A and 27B show how rechargeable batteries and a circuit board are connected.

The circuit board 206 has a connection pattern used to connect the two rechargeable batteries 201 in series or parallel and a battery protection circuit for protecting the rechargeable batteries 201 against overcharge/overdischarge. As shown in FIG. 27A, the positive and negative electrode leads 11 and 12 of each rechargeable battery 201 are connected to a land formed on the circuit board 206. The positive electrode lead 11 is made of an aluminum foil, while the negative electrode lead 12 is made of a copper foil. The positive electrode lead 11 cannot readily be soldered to the land, and therefore the positive and negative electrode leads 11 and 12 are welded to the land by ultrasonic welding, or the leads are welded to a nickel plate by ultrasonic welding followed by soldering the nickel plate to the land. Each lead wire of the connector 209 is connected in a prescribed position of the circuit board 206 by soldering.

Figure 27B:
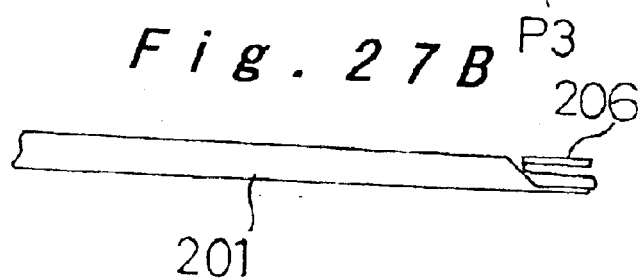

At the circuit board 206 connected with the positive and negative electrode leads 11 and 12, the leads 11 and 12 are bent and provided on the lead extended edge P3 of the rechargeable battery 201 as shown in FIGS. 27A and 27B. In this state, since the two rechargeable batteries 201 are connected to the circuit board 206 by the positive and negative electrode leads 11 and 12, which is an unstable state. Consequently, an assembling jig 210 as shown in FIG. 28 is used for integration by taping.

Figure 28:
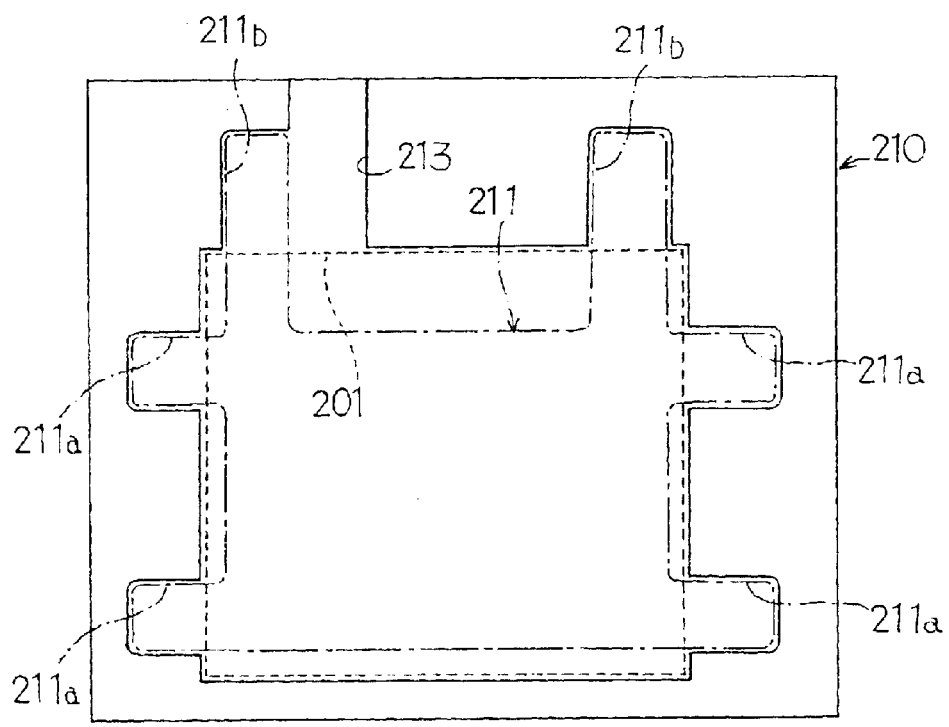
FIG. 28 is a plan view of an assembling jig.
Figure 29:
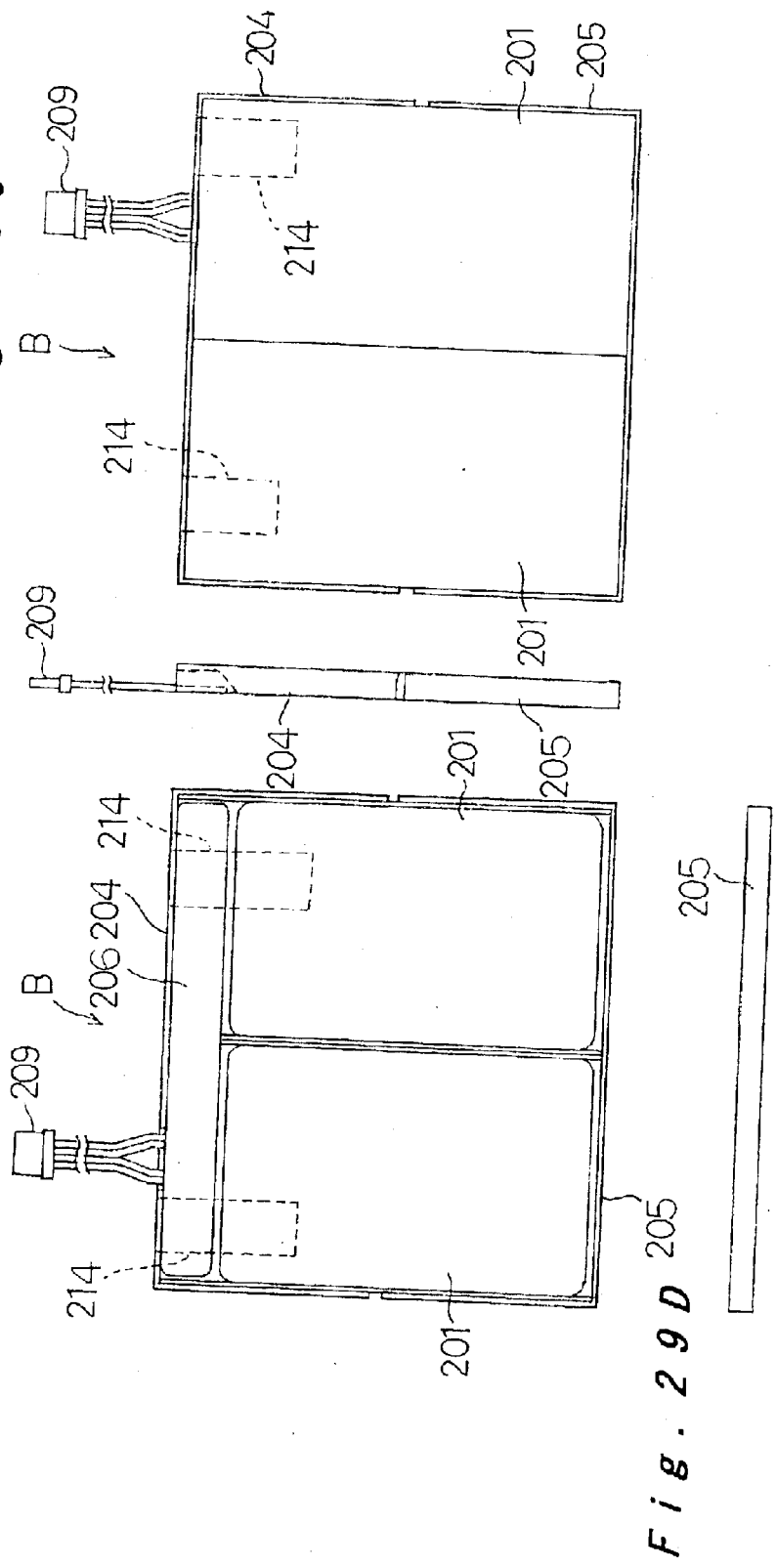
FIGS. 29A to 29D show a battery pack according to the embodiment.

As shown in FIG. 28, the assembling jig 210 has a positioning recess 213 formed corresponding to the shape of the two rechargeable batteries 201 and a backside adhesive sheet 211. The backside adhesive sheet 211 cut into a shape as denoted by the virtual line is positioned on the positioning recess 213 so that the adhesive surface faces up. Then, as denoted by the broken line, two rechargeable batteries 201 connected with the circuit board 206 are pressed onto the adhesive sheet 211. The positioning recess 213 has its central part having a size and shape defined as the two rechargeable batteries 201 are closely contacted at their side surfaces. Accordingly, the two rechargeable batteries 201 have their side surfaces in a close contact state. Then, binding pieces 211a, two each branching on the right and left sides of the backside adhesive sheet 211 are attached on the front side from the side surfaces of the rechargeable batteries 201, and the circuit board 206 is pressed by two board securing pieces 211b branching from the upper side to be attached to the front surface of the rechargeable batteries 201. Then, a front surface adhesive sheet 212 between the two closely contacted rechargeable batteries 201 is attached on the front surface side, and then as shown in FIGS. 26A to 26D, the two rechargeable batteries 201 and the circuit board 206 are integrated into a battery pack A.

As shown in FIG. 26C, the battery pack A thus integrated has the two rechargeable batteries 201 integrally connected in a wide surface of the back surface adhesive sheet 211, and the four binding pieces 211a bind the seal edges P1 and P2 of the rechargeable batteries 201. The expansion of width by the elasticity is prevented, and the sealing characteristic is improved. The board securing pieces 211b secure the circuit board 206 on the lead extended edge P3 to integrate the rechargeable batteries 201 and the circuit board 206.

A battery pack B according to the embodiment will now be described in conjunction with FIGS. 29A to 29D and FIG. 30. Note that the same elements as those of the battery pack A are denoted with the same reference numerals and will not be described.

In FIGS. 29A to 29D, two rechargeable batteries 201 are connected by an adhesive at the side surfaces in contact with each other. Here, a double-faced adhesive tape is used as the adhesive. The positive and negative electrode leads 11 and 12 of the two rechargeable batteries 201 are connected to the circuit board 206, which is provided on the lead extended edge P3 of the two rechargeable batteries 201. Two binding members 204 and 205 are attached to surround the side periphery of the two rechargeable batteries 201.

Figure 30:
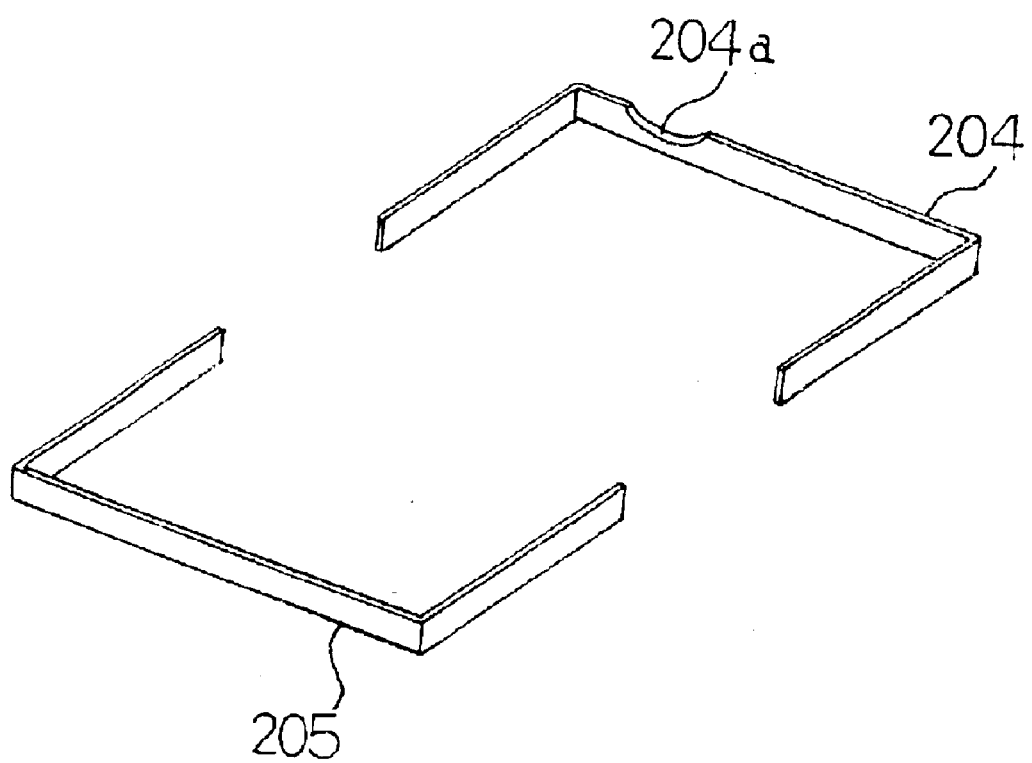
FIG. 30 is a perspective view of a binding member.
Figure 31:
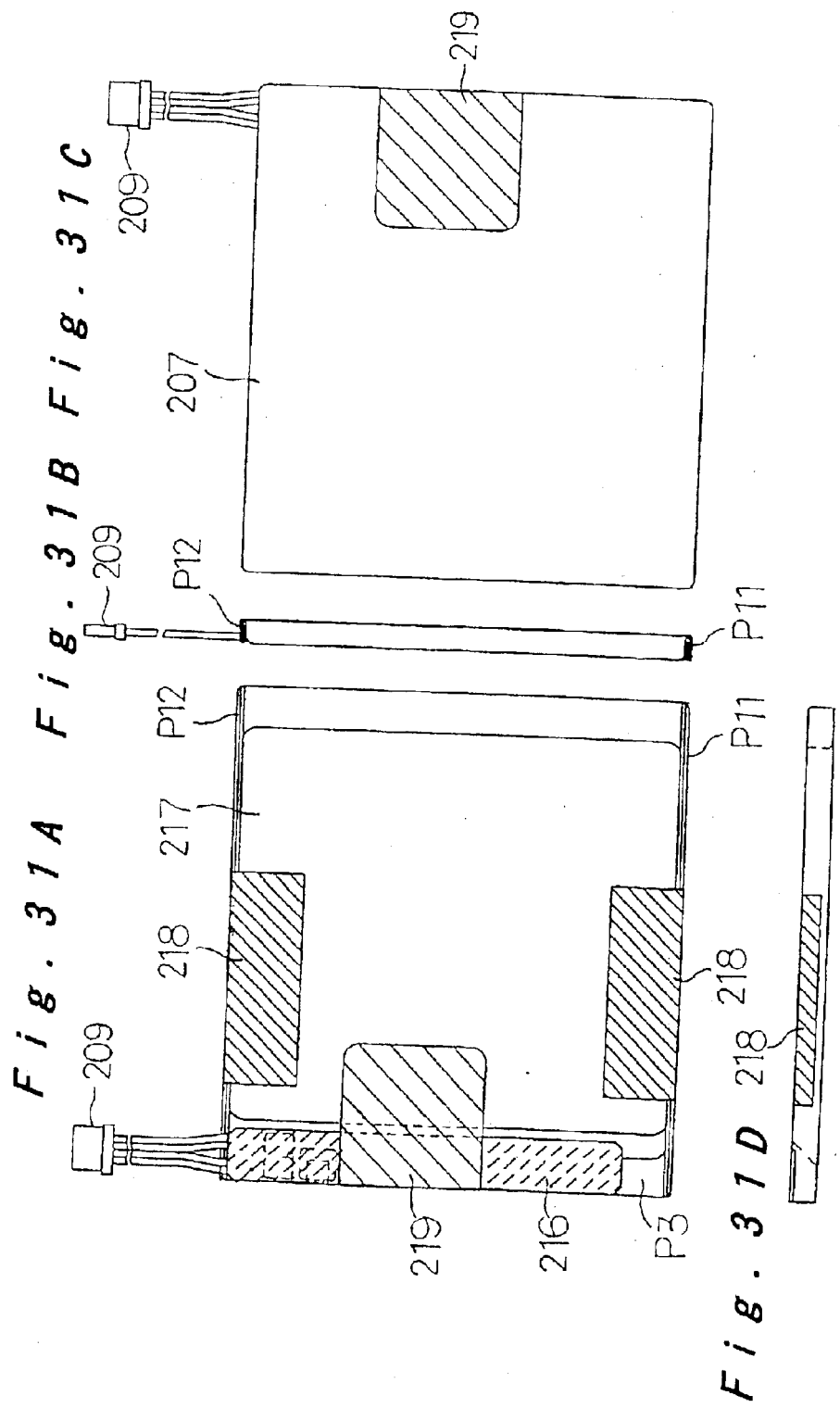
FIGS. 31A to 31D show a battery pack according to the embodiment.

As shown in FIG. 30, the binding members 204 and 205 are produced by bending into a U shape a resin plate having a width the same as a thickness of the rechargeable batteries 201 and attaching an adhesive (double-faced adhesive tape in this case) to the inner side. The binding member 204 is provided with a notch 204a through a lead for the connector 209. The binding members 204 and 205 are attached to the side surface of the rechargeable batteries 201 as shown in FIGS. 29A to 29D, and the two rechargeable batteries 201 are integrated, so that the circuit board 206 can be secured to the rechargeable batteries 201 with an adhesive sheet 214 to complete an integrated battery pack B.

The structure of a battery pack C according to the embodiment will now be described in conjunction with FIGS. 31A to 31D. Note that the same elements as those of the foregoing embodiments are denoted by the same reference numerals and will not be described.

A rechargeable battery 207 applied to a battery pack C has positive and negative electrode plates forming a power generating element with a larger area, so that a battery capacity equivalent to that of the above two rechargeable batteries 201 connected in parallel is obtained and similarly a laminated sheet is used for the outer case.

Positive and negative electrode leads (not shown) extended from the lead extended edge P3 of the rechargeable battery 207 are connected with a circuit board 216. The circuit board 216 is provided on the lead extended edge P3 and secured to the rechargeable battery 207 by a board securing adhesive sheet 219. The seal edges P1 and P2 on both sides of the rechargeable battery 207 are bent to the side surface and secured by a seal edge securing adhesive sheet 218.

These battery packs A, B, and C described above are provided in a storing position in each device where they are used, and the connector 209 is connected to the device to allow the battery pack to operate as a battery power source device.

Figure 32:
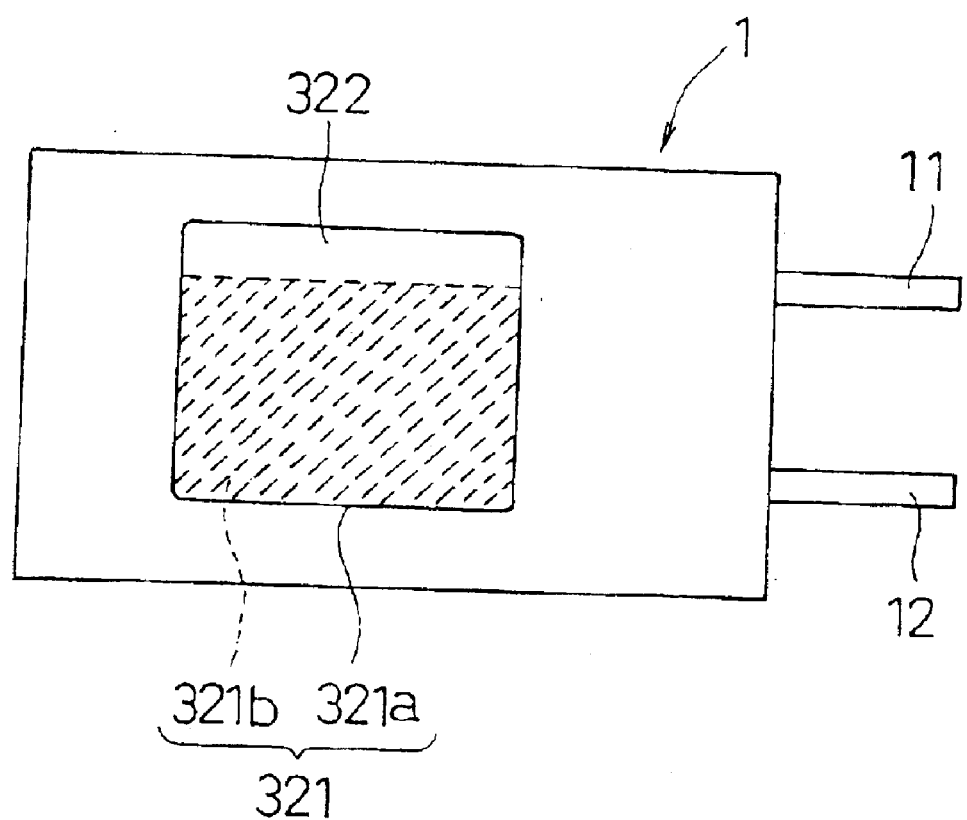
FIG. 32 is a plan view of a rechargeable battery according to the embodiment.

The rechargeable batteries 1 described in conjunction with the above embodiments (as well as the rechargeable batteries 102, 201) are generally secured to a mounting position with a double-faced adhesive sheet and as shown in FIG. 32, a double-faced adhesive sheet 321 is attached at the plane surface. The double-faced adhesive sheet 321 is made of an adhesive layer 321b adhered to the plane surface of the rechargeable batteries 1 and a lining sheet 321a covering the adhesive layer 321b. If the lining sheet 321a and the adhesive layer 321b have the same area, it would not be easy to remove the lining sheet 321a, which might cause the soft outer case of the laminated sheet to be damaged or recessed with pressure.

Thus, as shown in FIG. 32, in the double-faced adhesive sheet 321, the lining sheet 321a has a larger area than that of the adhesive layer 321b, so that a tab 322 without the adhesive layer 321b at the backside is located in an arbitrary side of the double-faced adhesive sheet 321. In this way, the lining sheet 321a can readily be removed with the tab 322, the rechargeable batteries 1 are prevented from being damaged, and the workability in securing the rechargeable batteries 1 improves.

Figure 33A:
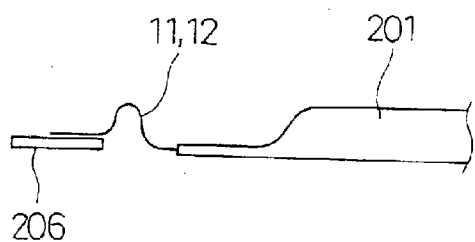
FIGS. 33A and 33B show how the leads are joined to the circuit board in the battery pack.
Figure 33B:
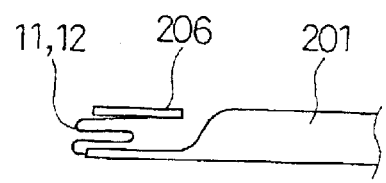

As in the fourth embodiment described above, in assembling the battery packs A, B, or C, the positive and negative electrode leads 11 and 12 are ultrasonic-welded to the circuit board 206 as they are bent as shown in FIG. 33A, and the circuit board 206 is secured on the lead extended edge of the rechargeable batteries 201 as they remain to be bent as shown in FIG. 33B.

Figure 34A:
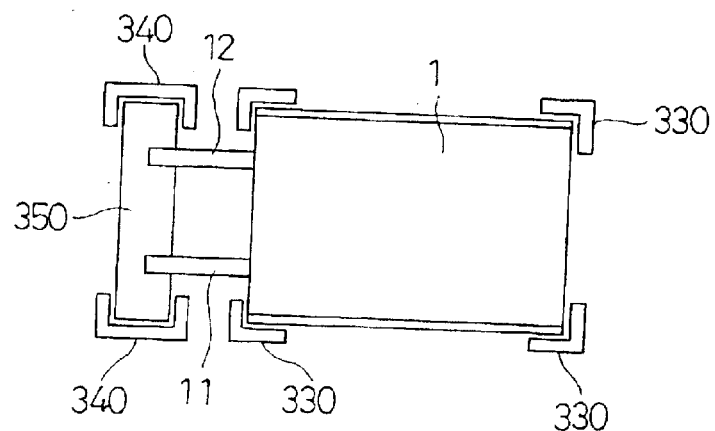
FIGS. 34A and 34B show the connection state of the leads to the circuit board in the battery pack.
Figure 34B:
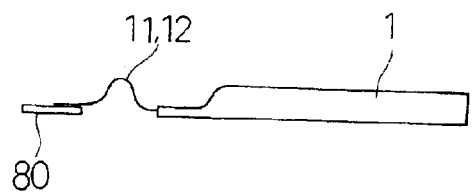
Figure 35:
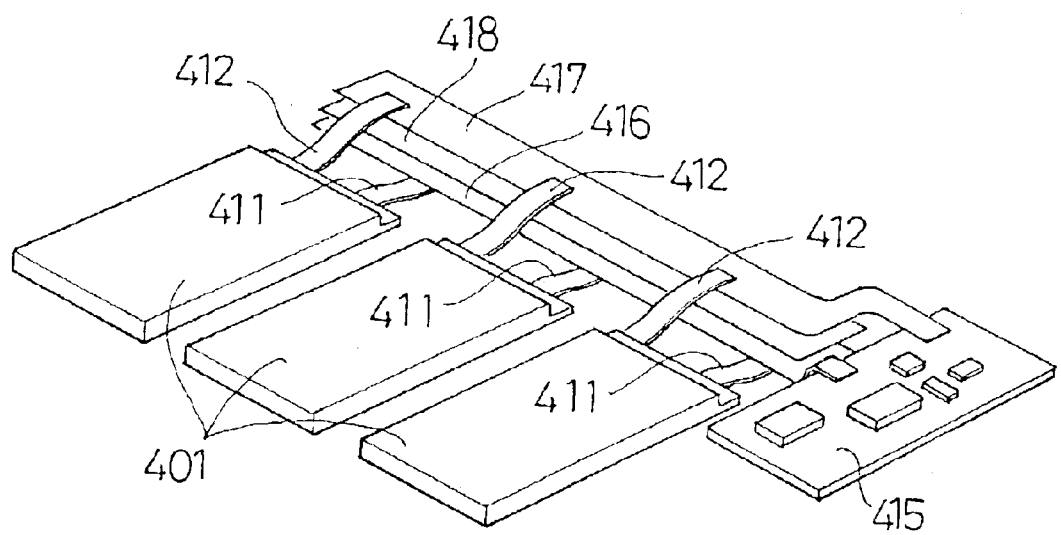
FIG. 35 is a perspective view of a conventional battery pack.

When the battery pack is assembled as in the first to third embodiments as described above and as shown in FIG. 34A the rechargeable batteries 1 are provided in a battery position restricting frame 330 and a circuit board 350 is provided in a board position restriction frame 340, the rechargeable batteries 1 and the circuit board 350 are provided such that the positive and negative electrode leads 11 and 12 are bent as shown in FIG. 34B.

As the positive and negative electrode leads 11 and 12 are bent in this way, impact is applied if for example the device provided with the battery pack is dropped, and the rechargeable batteries 1 or 201 deform because their outer case is soft, the bent part of the positive and negative electrode leads 11 and 12 absorbs the deformation, and the positive and negative electrode leads 11 and 12 are not broken. In addition, when the battery pack is assembled and the circuit board 206 is reversed and moved onto the lead extended edge of the rechargeable batteries 201, extreme tensile force is not applied upon the positive and negative electrode leads 11 and 12, so that the leads are prevented from being broken.

INDUSTRIAL APPLICABILITY

As in the foregoing, according to the present invention, when a battery power source device is assembled using a plurality of rechargeable batteries having an outer case made of a laminated sheet, the batteries are readily connected in parallel or series without damaging foil type leads extended from the rechargeable batteries. The connection is made on the circuit board, and therefore the rechargeable batteries and the circuit board do not have to be connected with a separate wiring member, which improves the workability. Consequently, the invention is useful in providing a battery power source device having high insulation and durability.

What is claimed is:

1. A battery power source device comprising a plurality of rechargeable batteries, said rechargeable battery storing a power generating element in an outer case made of a laminated sheet and being formed in a flat, approximately prismatic shape, positive and negative electrode leads and being extended in the same direction from a same lead extended side of the outer case thermally sealed, said plurality of rechargeable batteries being arranged in parallel such that their lead extended edges are in the same direction, said power source device comprising a circuit board including a conductive pattern and a battery protection device formed thereon, said circuit board being provided on the lead extended edge of each said rechargeable battery, the positive and negative electrode leads of each said rechargeable battery being joined to a prescribed conductive pattern formed in the extending direction of each lead on the same surface of the circuit board, whereby a connection circuit formed by the conductive pattern on the circuit board connects each said rechargeable battery to an input/output terminal through the battery protection device.

2. The battery power source device according to claim 1, wherein
the circuit board to which the leads of the rechargeable batteries are connected is placed on the lead extended edge of the rechargeable batteries arranged in parallel.

3. A battery power source device comprising a plurality of rechargeable batteries stored in a park case, said rechargeable battery storing a power generating element in an outer case made of a laminated sheet and being formed in a flat, approximately prismatic shape, positive and negative electrode leads and of the batteries being extended in the same direction from a same lead extended edge of the outer case, the plurality of rechargeable batteries being arranged in parallel in said pack case such that their lead extending directions are in the same direction, a circuit board including a conductive pattern and a battery protection device formed thereon being positioned on the lead extended edge of the rechargeable batteries, the positive and negative electrode leads of each said rechargeable battery being joined to a prescribed conductive pattern formed in the extending direction of each lead on the same surface of the circuit board, whereby a connection circuit formed by the conductive pattern on the circuit board connects each said rechargeable battery to an input/output terminal through the battery protection device.

4. The battery power source device according to claim 3, wherein the battery protection device comprises an overcurrent protection element connected in series with each said rechargeable battery and a protection circuit for protecting the rechargeable battery against overcharge/overdischarge.

5. The battery power source device according to claim 4, wherein
the overcurrent protection element is an overcurrent fusing type fuse.

6. The battery power source device according to claim 3, wherein
components for forming a protection circuit are collectively provided in a prescribed position of the circuit board.

7. The battery power source device according to claim 3, wherein the connection circuit of the circuit board connects the plurality of rechargeable batteries in parallel.

8. The battery power source device according to claim 3, wherein the connection circuit of the circuit board connects the plurality of rechargeable batteries in series.

9. The battery power source device according to claim 3, wherein the connection circuit of the circuit board connects the plurality of rechargeable batteries in series-parallel.

10. A battery power source device comprising a plurality of rechargeable batteries stored in a pack case, said rechargeable battery storing a power generating element in an outer case made of a laminated sheet and being formed in a flat, approximately prismatic shape, said pack case including upper and lower cases and formed in a pair of halves, the upper and lower cases having position restriction walls to restrict a position to store the rechargeable batteries, the walls being formed around side surfaces of the plurality of rechargeable batteries, the lower case storing the plurality of rechargeable batteries being joined with the upper case between said position restriction walls and side circumferential walls for integrating both cases.

11. The battery power source device according to claim 10, wherein
projecting walls and the side circumferential walls facing each other between the upper case and the lower case have a recessed portion on one side, and a raised portion to be fitted into the recessed portion on the other side.

12. The battery power source device according to claim 11, wherein
a V-shaped groove having a V-shaped section is formed at a bottom of the recessed portion, a V-shaped rib having a V-shaped section to be fitted with said V-shaped groove is formed at a tip end of the raised portion, and the recessed portion and the raised portion are joined between the V-shaped groove and the V-shaped rib by ultrasonic welding.

13. The battery power source device according to claim 10, wherein
a height of a battery storing space between the upper case and the lower case is smaller than a thickness of the rechargeable battery.

14. A battery power source device comprising a plurality of rechargeable batteries stored in a pack case, said rechargeable battery storing a power generating element in an outer case made of a laminated sheet and being formed in a flat, prismatic shape, said pack case including an upper case and a lower case formed in a pair of halves, position restriction walls to restrict a position to store the rechargeable batteries, the walls being formed around side surfaces of the plurality of rechargeable batteries at the upper and lower cases, surfaces in contact with flat planes of the plurality of rechargeable batteries at the upper case and/or the lower case being formed into an elastic deforming surface elastically deforming corresponding to a change in a thickness of the rechargeable batteries, the lower case storing the plurality of rechargeable batteries being joined to the upper case between said position restriction walls and side circumferential walls for integrating both cases.

15. The battery power source device according to claim 14, wherein a metal thin plate is attached to an outer surface of the elastic deforming surface.

16. A battery power source device comprising a rechargeable battery and a circuit board having a power source circuit including a battery protection circuit, positive and negative electrode leads of a metal foil extended from the rechargeable battery being joined by ultrasonic welding to a prescribed land formed by a conductive pattern on a surface of said circuit board.

17. The battery power source device according to claim 16, wherein
IC parts forming the battery protection circuit are secured to the circuit board by resin mold.

18. A battery power source device comprising a rechargeable battery storing a power generating element in an outer body made of a pair of laminated sheets, said pair of laminated sheets being thermally sealed at peripheries thereof, said rechargeable battery being formed in a plate shape whose positive and negative electrode leads and are extended to the outside from one lead extended edge; and
a circuit board having at least a battery protection circuit, said rechargeable battery and said circuit board being integrated, said rechargeable battery being secured on a metal plate.

19. The battery power source device according to claim 18, wherein
the rechargeable battery and/or the metal plate are/is provided with an insulator for electrically insulating them.

20. The battery power source device according to claim 19, wherein
the insulator is an insulating coating provided on a surface of the metal plate.

21. The battery power source device according to claim 19, wherein
the insulator is an insulating sheet attached to the rechargeable battery or the metal plate.

22. The battery power source device according to claim 18, further comprising a temperature detecting sensor, detecting a battery temperature, secured to a corner of a part storing the power generating element of the rechargeable battery where a seal edge of the rechargeable battery is raised.

23. The battery power source device according to claim 18, further comprising a liquid absorbing sheet attached at a safety vent forming edge and the lead extended edge of the rechargeable battery.

24. A battery power source device comprising a rechargeable battery and a circuit board having a power source circuit, said rechargeable battery storing a power generating element in an outer case made of a pair of laminated sheets having their peripheries sealed by welding and being formed in a flat, approximately prismatic shape, positive and negative electrode leads of the battery being extended to the outside from one lead extended edge sealed by welding, said positive and negative electrode leads being connected in prescribed positions on said circuit board, the circuit board being provided on said lead extended edge, the circuit board being attached and secured to the rechargeable battery by an adhesive sheet.

25. The battery power source device according to claim 24, wherein a plurality of the rechargeable batteries are arranged in parallel, have their lead extended edges arranged on the same plane and in the same direction, and are secured in parallel by an adhesive sheet.

26. A battery power source device comprising a plurality of rechargeable batteries arranged in parallel having their lead extended edges arranged in the same direction, said rechargeable battery storing a power generating element in an outer case made of a pair of laminated sheets having their peripheries sealed by welding and being formed in a flat, prismatic shape, positive and negative electrode leads of the rechargeable battery being extended to the outside from one lead extended edge sealed by welding, adjacent rechargeable batteries being joined with an adhesive between their side surfaces, said positive and negative electrode leads of the rechargeable batteries being connected in prescribed positions on a circuit board having a power source circuit, the circuit board being provided on said lead extended edge, a binding member being attached around side peripheries of the rechargeable batteries arranged in parallel.

27. The battery power source device according to claim 26, wherein the binding member is a pair of members formed in a U-shape to surround the side periphery.

28. A rechargeable battery comprising a power generating element stored in an outer case made of a pair of laminated sheets having their peripheries sealed by welding, the battery being formed in a flat, approximately prismatic shape, positive and negative electrode leads of the battery being extended to the outside from one lead extended edge sealed by welding, a double-faced adhesive sheet to secure the rechargeable battery in a prescribed position being attached on a flat surface of the rechargeable battery, a lining sheet of the double-faced adhesive sheet having a part not provided with an adhesive at an arbitrary side of the double-faced adhesive sheet.

29. A battery power source device comprising:

a rechargeable battery storing a power generating element in an outer case made of a pair of laminated sheets having their peripheries sealed by welding and being formed in a flat, approximately prismatic shape, positive and negative electrode leads and of said battery being extended from one lead extended edge sealed by welding; and a circuit board having a land onto which each of the positive and negative electrode leads is joined by ultrasonic welding, the rechargeable battery and the circuit board being positioned such that said lead is bent at the time of said ultrasonic welding and securing to a prescribed position.

* * * * *